United States Patent [19]

Gardner

[11] Patent Number: 5,462,631
[45] Date of Patent: Oct. 31, 1995

[54] TAPE WINDING APPARATUS

[76] Inventor: John P. Gardner, Grasson, Grotherington Fields, Grotherington Cross, Evesham Road, Cheltenham, Gloucestershire, United Kingdom

[21] Appl. No.: 12,288

[22] Filed: Feb. 1, 1993

Related U.S. Application Data

[63] Continuation-in-part of Ser. No. 975,991, Nov. 13, 1992, abandoned, which is a continuation of Ser. No. 719,649, Jun. 6, 1991, abandoned, which is a continuation of Ser. No. 409,748, Sep. 20, 1989, abandoned, which is a continuation of Ser. No. 890,078, Jul. 24, 1986, Pat. No. 4,911,774 which is a continuation-in-part of PCT/GB92/10191, Jun. 17, 1992.

[30] Foreign Application Priority Data

| Jun. 17, 1991 | [GB] | United Kingdom | 9112982 |
| Jun. 17, 1991 | [GB] | United Kingdom | 9112985 |
| Jun. 17, 1991 | [GB] | United Kingdom | 9112986 |

[51] Int. Cl.⁶ .............................. B31F 5/00; G03D 15/04
[52] U.S. Cl. .................. 156/505; 156/157; 156/361; 156/495
[58] Field of Search ................... 156/159, 502, 156/505, 506, 157, 361, 495; 242/58.5

[56] References Cited

U.S. PATENT DOCUMENTS

| 3,787,270 | 1/1974 | King | 156/506 |
| 3,888,480 | 6/1975 | Bagozzi | 156/506 X |
| 4,216,052 | 8/1980 | Zielke | 156/502 |
| 4,486,262 | 12/1984 | Woodley | 156/505 X |
| 4,668,328 | 5/1987 | Kyytsönen | 156/502 |
| 4,683,017 | 7/1987 | Figiel et al. | 156/502 X |
| 4,828,194 | 5/1989 | Kubo | 156/502 X |

*Primary Examiner*—David A. Simmons
*Assistant Examiner*—Paul M. Rivard
*Attorney, Agent, or Firm*—Gregory M. Howison

[57] ABSTRACT

A tape loader has a splicing station including a splicing block whose underside is grooved and provided with perforations constituting vacuum shoes. A slitting head mounts a blade which cooperates with the grooved under surface in slitting tape across its lateral dimension while it is received in its groove retained by vacuum. A splicing arm operates through an orifice in a face plate to splice together two lengths of tape retained in the groove. Operating on the front face of the face plate is a final guide assembly comprising an eccentric plate having a leader tape extraction arm; a bearing block housing a journal into which a cylindrical boss, integral with the plate, is rotatably received; and an internal flange of the boss forming a tooth wheel operably with a belt to apply the output of a motor to drive the plate. The changeover arm is comprised of a cranked changeover arm member mounted to a sleeve secured to a shaft passing through an orifice in the face plate. A clasp comprises a barrel received in a sleeve having a cylindrical type contact surface being provided by the barrel between annular enlargements. The tape issues in operation from a vacuum trough and is manually grasped by its end, disposed on the curved surface of the clasp and urged downwardly whereby through compression of the coil springs a quadrant surface is depressed radially inwardly.

22 Claims, 21 Drawing Sheets

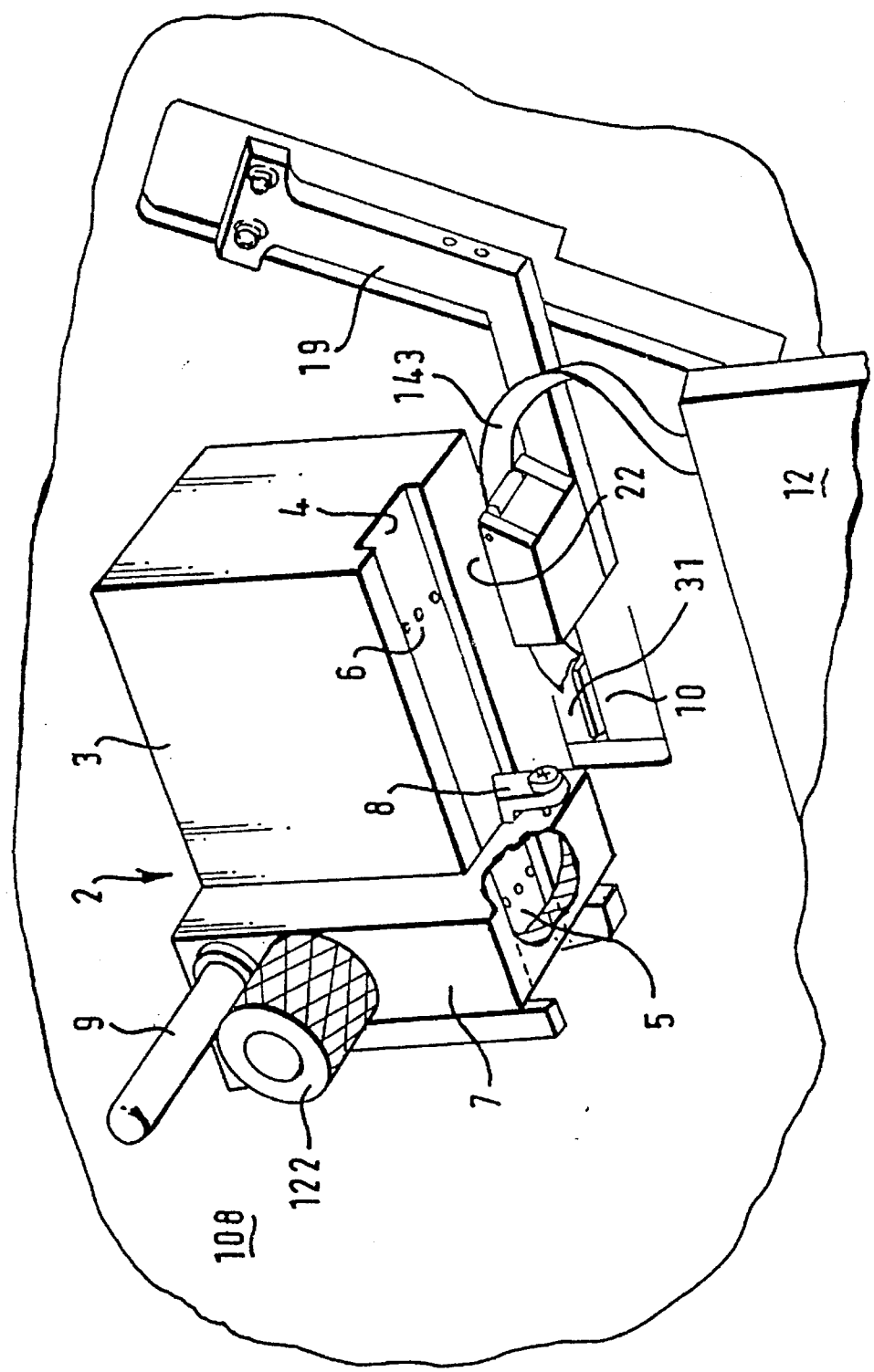

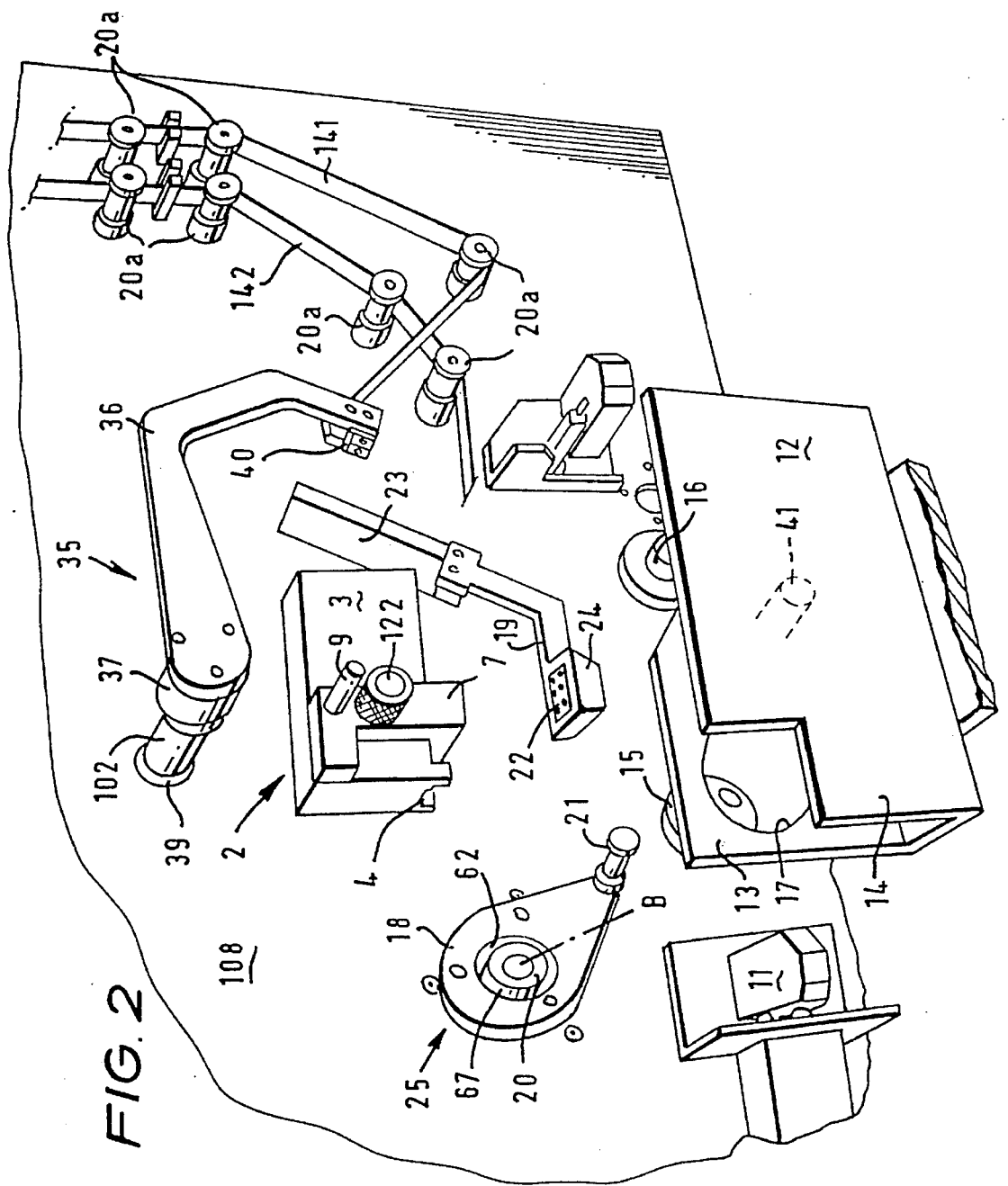

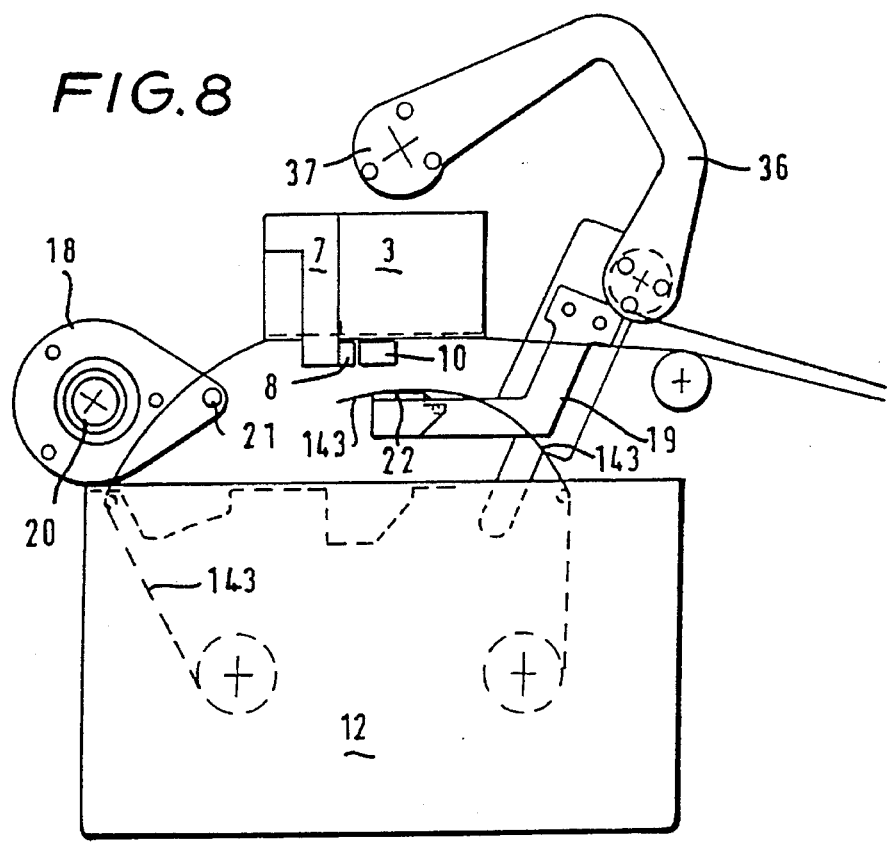
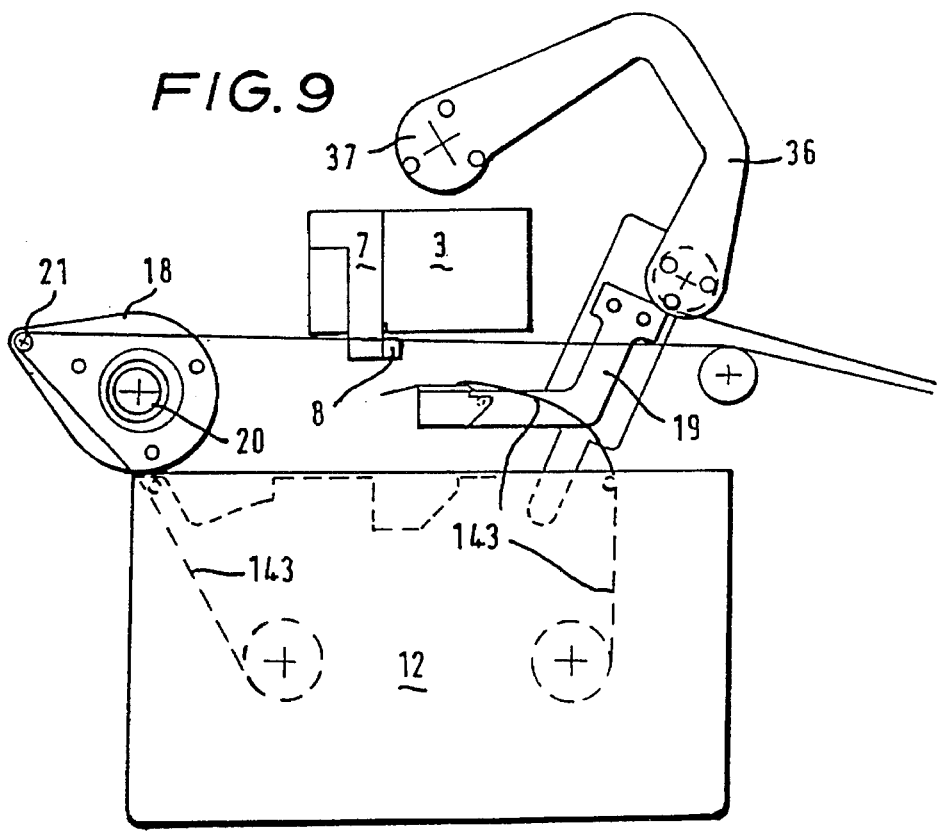

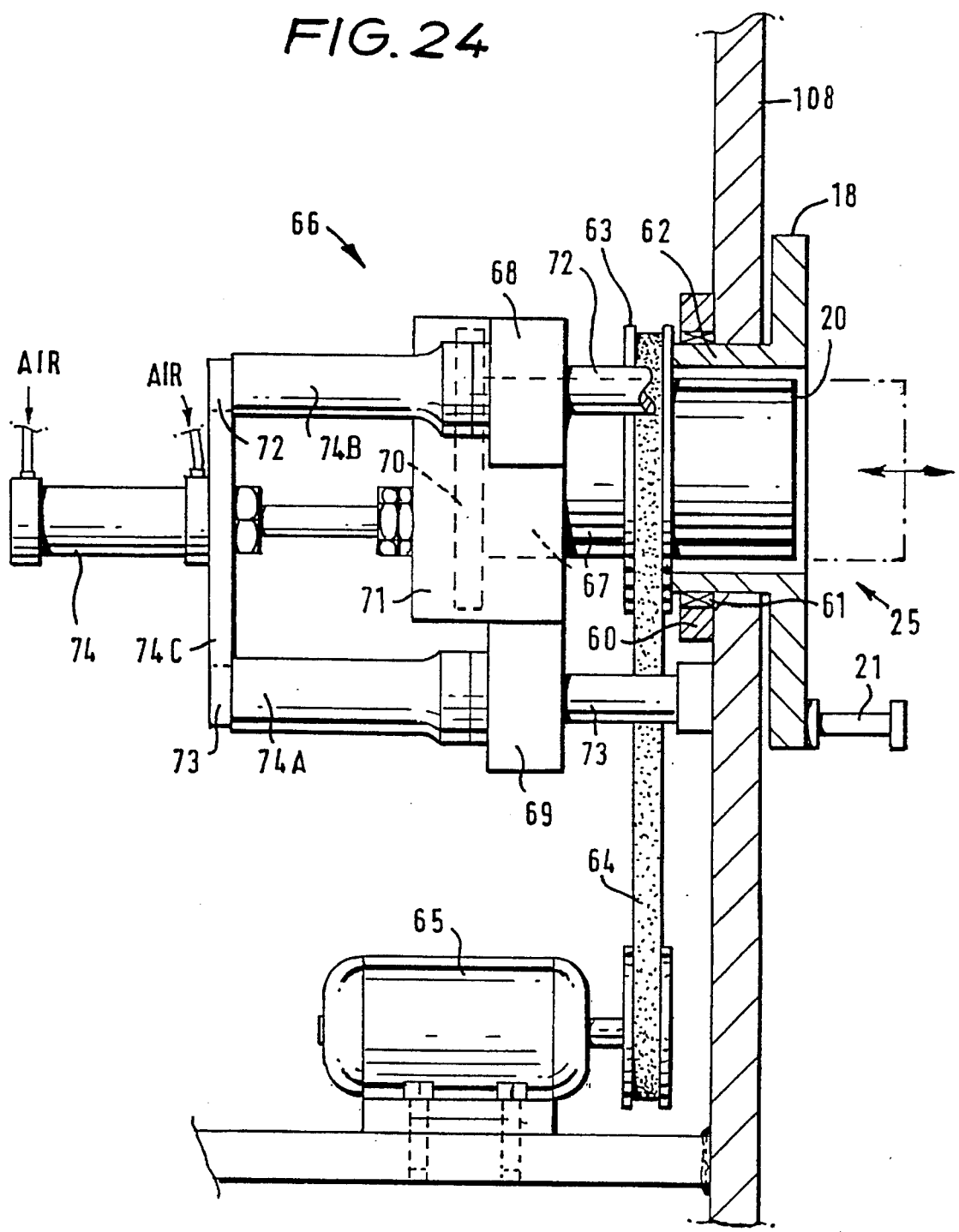

TAPE WINDING APPARATUS

CROSS-REFERENCE TO RELATED APPLICATIONS

This application is with U.S. patent Ser. No. 08/012,286, now abandoned (Atty. Docket No. MALC-21,597), filed concurrent herewith and entitled "Improved Double-Pancake Loader Extractor", which is a continuation of PCT Application No. PCT/GB92/01091, entitled "Improved Double-Pancake Loader Extractor", which designated the United States and which was filed on Jun. 17, 1992.

This application is a continuation-in-part of U.S. patent application Ser. No. 07/975,991, filed Nov. 13, 1992 and entitled "Splicing and Loading of Tape Into Cassettes", now abandoned, which is a continuation of U.S. patent application Ser. No. 07/719,649, filed Jun. 6, 1991 and subsequently abandoned, which was a continuation of U.S. patent application Ser. No. 07/409,748, which was filed on Sep. 20, 1989, now abandoned, which was a continuation of U.S. patent application Ser. No. 06/890,078, filed Jul. 24, 1986, entitled "Method of Splicing and Loading of Tape Into Cassettes", which issued as U.S. Pat. No. 4,911,774, and a continuation-in-part of PCT Application No. PCT/GB92/01091, entitled "Improved Double-Pancake Loader Extractor", which designated the United States and which was filed on Jun. 17, 1992.

FIELD OF THE INVENTION

The invention relates to an apparatus and method for loading or winding of tape into cassettes. The invention is in particular (but not exclusively) concerned with the loading of magnetic tape into video cassettes.

BACKGROUND OF THE INVENTION

Magnetic tape cassettes (eg audio and video tape cassettes) are supplied commercially either as blank tape or as prerecorded tape. In both cases, the cassette comprises two rotatable hubs, two lengths of leader tape one secured to each hub and a predetermined length of magnetic use tape having its ends spliced to the two leaders.

In manufacture of a cassette tape, magnetic tape is loaded to a leadered cassette, ie a cassette containing a relatively short length of leader secured by one end to one hub and by the other end to the other hub. Such a leadered cassette for audio use is known as a "C-zero cassette" whilst such a cassette constructed for video use is known as a "V-zero cassette". The first step in loading is to cut the leader into two separate leader lengths. The magnetic tape to be loaded is then spliced to one length of leader and the hub to which that leader length is connected is rotated to wind a predetermined length of magnetic tape onto the same hub. The magnetic tape is then cut and its trailing end spliced to the leading end of the remaining leader length so that the two hubs are connected by a leader-magnetic-leader continuous tape sequence.

The above sequence of operations can be carried out as hand work, but in modern practice the operation is mechanised to provide manufacturing speed and uniform product quality. A typical apparatus for performing these operations is disclosed in U.S. Pat. No. 3,637,153. The apparatus disclosed in U.S. Pat. No. 3,637,153 comprises means for holding a supply reel of magnetic tape, means for supporting a tape cassette (eg by its hubs), a splicing assembly comprising a stationary splicing head and first and second moveable splicing heads which are alternately moveable into contiguous relation with the stationary splicing head, means for releasably holding tape ends on the stationary and moveable splicing heads, means for slitting tape supported by the splicing assembly, means for rotating the supply reel and one of the cassette hubs to cause magnetic tape spliced to a leader on the hub to be unwound from the supply reel and wound on the hub in question, and means for applying splicing tape to the abutting ends of leader and magnetic tapes supported by the splicing assembly. In operation, cassette loading commences with the leader ends (ie a cut hub-hub leader length) held on the contiguously disposed stationary head and first splicing head, respectively, and the end of the magnetic tape held on the second splicing head. The first moveable splicing head is then moved away from the stationary splicing head and the second moveable head with its held end of the magnetic tape is moved into contiguous relation with the stationary head. This brings the leader held on the stationary head into end-to-end abutment with the magnetic tape and the two are then spliced together. The spliced tape is then wound onto the cassette hub to which the leader is secured and winding continued until a predetermined length of magnetic tape is then slit. The second moveable splicing head, which continues to hold the leading edge of the magnetic tape supply, is then removed away from the stationary head leaving a trailing end of magnetic tape from the newly loaded cassette held by the stationary head. Moving the first moveable splicing head back into contiguous relation with respect to the stationary head juxtapose the leading end of the remaining cut leader length in abutment to the trailing end of magnetic tape held on the stationary head. These two ends are then spliced to complete the production of a loaded cassette. The apparatus described in U.S. Pat. No. 3,637,153 includes control means for selectively operating the components of the apparatus to perform the above-described operations in the sequence given.

In tape winding operations, the magnetic tape is pulled into the cassette by a motor driving the hub inside the cassette. This means that the tape is under greatest tension just before it enters the cassette. The tension in the tape reduces at every point of mechanical contact with the guides, cleaning fabric and so on on the tape winding path. Design considerations mean the last guide before the tape enters the cassette is often used as both a rotating guide around which the tape runs at maximum tension during winding and the extracting device used to pull the leader from the cassettes. In order to do this, it must be of sufficiently small diameter to pass through the appropriate aperture in the cassette to take up a position under the leader tape. However, since tape winding takes place at speeds up to 20 m/sec, the rotational speed of the rotational guide has to be very high and this can lead to tape damage when using small diameter final guides, particularly under tension.

Tape winding speed is monitored by a tacho device in contact with the tape. The thinness of the tape being wound and the requirement that is must not be stretched or damaged is responsible for practice dictactin that winding takes place at low tensions. This is exacerbated by the traditional practice dictated by design considerations of locating the tacho wheel upstream of the splicing surface and receiving tape issuing from the supply pancake. Coupled with the high speed of winding, it is difficult to keep the tape in contact with a conventional tacho wheel.

Equipment made by Tapematic and Jing-Wa overcome the problems associated with small diameter final guides by constructing the final guide leader extraction arm as an air bearing in which a plurality of air apertures are used to eject air between the guide surface and the tape as lubrication. Otami equipment combines a retractable large diameter final guide with a leader extraction arm. The extractor extracts leader tape from a lid-down oriented cassette and introduces the leader tape to a splicing surface. A retracted large diameter guide advances into the tape loop and is then displaced laterally within the loop until it contacts the tape adjacent to the input mouth of the cassette. The leader having been extracted, splicing and winding then follow whilst both the guide and extractor remain in contact with the tape.

Print tapes for use in impact printers, such as used in an office context driven by computers, is conveniently made in cassette or cartridge form. In general terms, such tape is subject to the same handling requirements as magnetic tape and broadly similar winding machinery can be deployed for loading such tape into cassettes.

SUMMARY OF THE INVENTION

According to a first aspect of the invention, there is provided a tape winding apparatus comprising a use tape supply station, a tape splicing station disposed so as in use to receive on a tape splicing surface thereof use tape wound from the use tape supply station in use, a cassette holding station disposed so as in use to receive on a hub of a cassette disposed at said cassette holding station tape wound from said tape splicing station, tape winding power means for driving said cassette hub to effect said winding of said tape, a plurality of tape guides defining with said splicing station a tape winding path from said tape supply station to said cassette hub, said plurality of tape guides including a final guide assembly for issuing tape to said cassette hub in winding of use tape from the use tape supply by the apparatus, said final guide assembly comprising leader extraction means comprising a leader extraction member and a final guide member, the leader extraction member having a rest position in which said member is disposed to penetrate beneath the non-extracted leader tape of the leader tape loop of a zero cassette charged to said cassette holding station and being mounted and arranged for two phases of reciprocatory displacement in the plane of said loop so that said leader extraction member can be removed from the locus of said cassette in a first phase of reciprocation to carry the leader tape loop externally from the cassette to said splicing surface of said splicing station and to the locus of said final guide member for release of said extracted tape loop and transfer thereof to said final guide member by said leader extraction member in a second phase of said reciprocatory displacement of said leader extraction member, said final guide member being displaceable laterally relative to the tape reciprocally between a position in and a position outside the plane of said loop at a final tape guiding location of the tape winding path at which said final guide member is otherwise fixed for rotation immediately upstream of and adjacent to the cassette input mouth, and said final guide member comprising a circularly cylindrical tape guide contact element which is mounted for rotation responsive to contact of its cylindrical surface in use by mobile tape winding to said driven cassette hub and guided by said tape guide contact element and which has a diameter sized too large to be accommodated beneath the aforesaid non-extracted leader tape of said cassette, tape cutting means disposed at said splicing station and addressing a cutting location at which tape is disposed on the splicing surface in use and tape splicing means for splicing tape ends together upon said splicing surface.

Preferably, the tape supply station comprises means for mounting a plurality of separate stores of tape. In particular, means may be provided to mount a pair of separate magnetic tape stores for sequential use and changeover means is provided to introduce to the tape winding path a tape supply from a second magnetic tape store once the tape supply from a first is exhausted or depleted to a predetermined extent.

The tape supply station is conveniently configured to provide a pair of tape stores in use and said changeover means is changeover means for addressing said use tape stores successively so as to introduce successively to said tape winding path, use tape from each of said use tape stores by disposition thereof upon said splicing surface by a transfer member of said changeover means displaceable between said supply station and said splicing station, said changeover means in use addressing one such use tape store preparative to introducing the use tape thereof to said winding path during the time the use tape of the other use tape store issues to the tape winding path to supply the splicing station and the cassette hub.

The changeover means may comprise a displaceable elongate member provided with a tape securing head.

The changeover means conveniently includes a tape securing head which comprises a mechanical clasp or (less preferably) a vacuum shoe.

The mechanical clasp referred to preferably comprises a tape carriage surface yieldingly supported by a compressible support means which yields resiliently under pressure from a tape length manually urged upon said tape carriage surface and jaw means overlying and normally in contact with said tape carriage surface and spaced therefrom when the tape carriage surface has yielded to form a mouth defined between said jaw means and said tape carriage surface, the jaw means comprising at least one member having a first mouth-defining face confronting the tape carriage surface but leaving part thereof exposed so as to provide an access to said tape carriage surface for said tape, said access accommodating the tape width only after its concurvature on a longitudinal tape axis, and a second face directed away from the tape carriage surface and configured to deform said tape to provide said concurvature with said manual urging of the tape length on said tape carriage surface.

The displaceable elongate member is preferably a cranked arm mounted for rotation through an arc between a first position in which said tape securing head and said arm are outside the tape winding path for manual provision to said head of a leading end of use tape emanating from a first of use tape stores and a second position in which said head is adjacent said splicing station and use tape carried by said head is disposed on said splicing surface for release thereto by said head.

Conveniently, the changeover means comprises a member displaceable by rotation between a tape pick-up location outside the tape winding path and a tape-release position in which said member addresses the tape splicing surface, the member being displaceable perpendicularly with respect to the plane of the aforesaid displacement between a lockable position in which the member can be locked in said tape pick-up position and the aforesaid rotational displacement is prevented and a position in which the member is free to suffer said displacement by rotation to said tape-release position.

The extraction means may be disposed for rotation displacement whereby the leader tape loop is carried to the splicing surface in said first phase of reciprocation and transferred to said final guide member in said second phase of reciprocation. The extraction member is preferably disposed for said rotational displacement about said final guide member. The leader extraction means is advantageously disposed for said rotational displacement about the axis of rotation of said final guide member.

The leader extraction means may comprise an eccentric mounted for said rotational displacement and provided with a tape extraction element forming said leader extraction member and originating therefrom proximate the extremity thereof radially most remote from the axis of rotation of said eccentric and serving as said leader extraction member.

The leader extraction means is preferably rotationally displaceable between stops which define the radial positions of the leader extraction member at which first the non-extracted leader tape is almost in contact by its underside with the leader extraction member and at which secondly the extracted leader tape loop carried by said leader extraction member defines a loop plane which is interfacially juxtaposed to the final guide member such that the extrapolated axis of rotation of said final guide member and an imaginary cylinder having the same axis and the diameter of said final guide member intersects with said loop plane.

The leader extraction means is conveniently disposed to be driven in use in its rotational displacement by a stepper motor.

The final guide member is conveniently reciprocatively displaceable linearly upon the axis of its rotation.

In preferred embodiments the apparatus includes a tachometric tape transport speed monitor including a tacho wheel and interfaced for the speed control purposes of the apparatus with said power means, and the plurality of tape guides defining with said splicing station and said tacho wheel said tape winding path from said tape supply station to said cassette hub, said tacho wheel being disposed in the tape winding path downstream of said splicing station.

The final guide member preferably forms a tacho wheel of a tachometric tape transport speed monitor interfaced for the speed control purposes of the apparatus with said power means.

The splicing surface is conveniently constructed as a vacuum shoe for tape retention purposes.

The splicing surface may be the floor of a groove depressed into the surface of a fixed splicing block and extending in the direction of the tape winding path.

The splicing surface is conveniently defined upon a splicing block formed with a cutter groove traversing the part of the tape winding path coincident with the splicing surface.

A leader tape retaining member is preferably provided to retain the portion of said leader tape issuing from said cassette and disposed upstream of said cutting location on said splicing surface.

The leader tape retaining member is preferably displaceable between a first position in which it is in use disposed beneath the non-extracted leader tape loop of the leader tape of the zero cassette and a second position in which it has been removed from the locus of the cassette to assist in carrying the leader tape loop externally of the cassette to said splicing surface of said splicing station.

The leader tape retaining member is advantageously disposed for displacement from the locus of the splicing surface to carry its charge of upstream leader tape from said tape path after operation of said tape cutting means to sever the leader tape into separate upstream and downstream leader tape portions and for reciprocal displacement to restore said upstream leader tape portion to said tape path at said splicing surface at termination of use tape winding into said cassette, preparative to splicing of the leading end of said upstream leader tape portion to the use tape trailing end disposed upon said splicing surface after operation of said tape cutting means in relation to use tape stationary on the splicing surface at said winding termination.

Preferably, the leader tape retaining member has a surface constructed as a vacuum shoe.

In preferred apparatus, the leader tape retaining member is a cranked elongate member.

The leader tape retaining means may be coupled to power means for driving said retaining means in linear reciprocatory displacement.

In a second aspect, the invention provides a method of loading tape into cassettes which method comprises disposing a leading end of use tape emanating from a use tape supply at a use tape supply station of a tape winding apparatus upon a splicing surface of the apparatus, whilst retaining the use tape on said splicing surface optionally cutting the tape across its lateral dimension to form separate upstream and downstream portions of use tape, charging a zero cassette to said apparatus subsequent to said cutting or at a previous juncture, extracting a loop of leader tape from said cassette and disposing said leader tape of said loop on the splicing surface, whilst retaining the leader tape on the splicing surface either cutting the leader tape across its lateral dimension in overlying relationship with the upstream portion of use tape and with the leader tape cut corresponding to the position of the cut end of the upstream portion of use tape whereby separate upstream and downstream portions of said leader tape are formed, or cutting the use tape and overlying leader tape together whereby both are cut into separate upstream and downstream portions, disposing the upstream leader tape portion on a leader tape retainer and removing said upstream leader tape portion from the splicing surface by displacement of said leader tape retainer, splicing the so exposed upstream portion of use tape on the splicing surface to the downstream portion of leader tape on the splicing surface, and winding use tape into the cassette, the downstream portion of said use tape being removed from the splicing surface, and at a post-winding juncture restoring the use tape to the splicing surface, cutting the use tape thereon, the upstream leader tape portion being brought into end-to-end abutment on the splicing surface with the trailing end of the so-cut use tape, splicing together the abutting ends and discharging the loaded cassette preparative to loading a further cassette, characterized in that the loop of leader tape is extracted from the cassette by disposing beneath the non-extracted leader tape loop of said cassette a leader extraction member of leader extraction means forming part of a final guide assembly comprising said leader extraction means and a final guide member of a plurality of tape guide members defining with said splicing surface a tape winding path from said use tape supply to said cassette, removing the leader extraction member from the locus of the cassette by displacement of said leader extraction member in the plane of said loop to carry said loop externally from the cassette to said splicing surface and to the locus of said final guide member, displacing said final guide member laterally relative to the tape through its width from a position outside the plane of said loop to a position in said plane at a final guiding location of the tape winding path at which said final guide is otherwise fixed for rotation immediately upstream of and adjacent to the cassette input mouth and at a post-splicing juncture releasing the tape loop from said leader extraction means to said final guide and from retention on said splicing surface preparative to said winding, and characterized in that at a post-winding juncture the leader extraction member collects the use tape from the final guide and disposes it upon the splicing surface and the final guide displaces reciprocally with respect to its aforesaid displacement.

DESCRIPTION OF THE PREFERRED EMBODIMENTS

One particular embodiment of the twin-pancake tape winding apparatus of the invention will now be described, by way of example only, reference being made to the accompanying drawings in which:

FIG. 1 shows the winding apparatus according to the invention schematically and in part only, the lift arm being shown external of the cassette;

FIG. 2 shows the winding apparatus according to the invention schematically and in part only (but is a global view with respect to splicing station and face plate components), the changeover arm being shown in its anti-clockwise extremity and the lift arm being shown at its lowermost extremity;

FIG. 8 shows the splicing station of the apparatus at a fifth stage of the operating sequence involved in loading a V-zero cassette, the use tape and leader tape having been cut, the latter having been spliced to the former, the spliced tape lengths still being retained on the splicing surface and an upstream leader tail being supported below the splicing surface by the lift arm tape retainer;

FIG. 9 shows the splicing station of the apparatus at a sixth stage of the operating sequence involved in loading a V-zero cassette, the tape being shown preparative to being wound onto the left hand hub of the cassette in a position slightly spaced from the splicing surface by the extractor arm;

FIG. 24 is a view partially cross-section taken along a vertical plane on the axis B shown in FIG. 2.

Figure 2A:
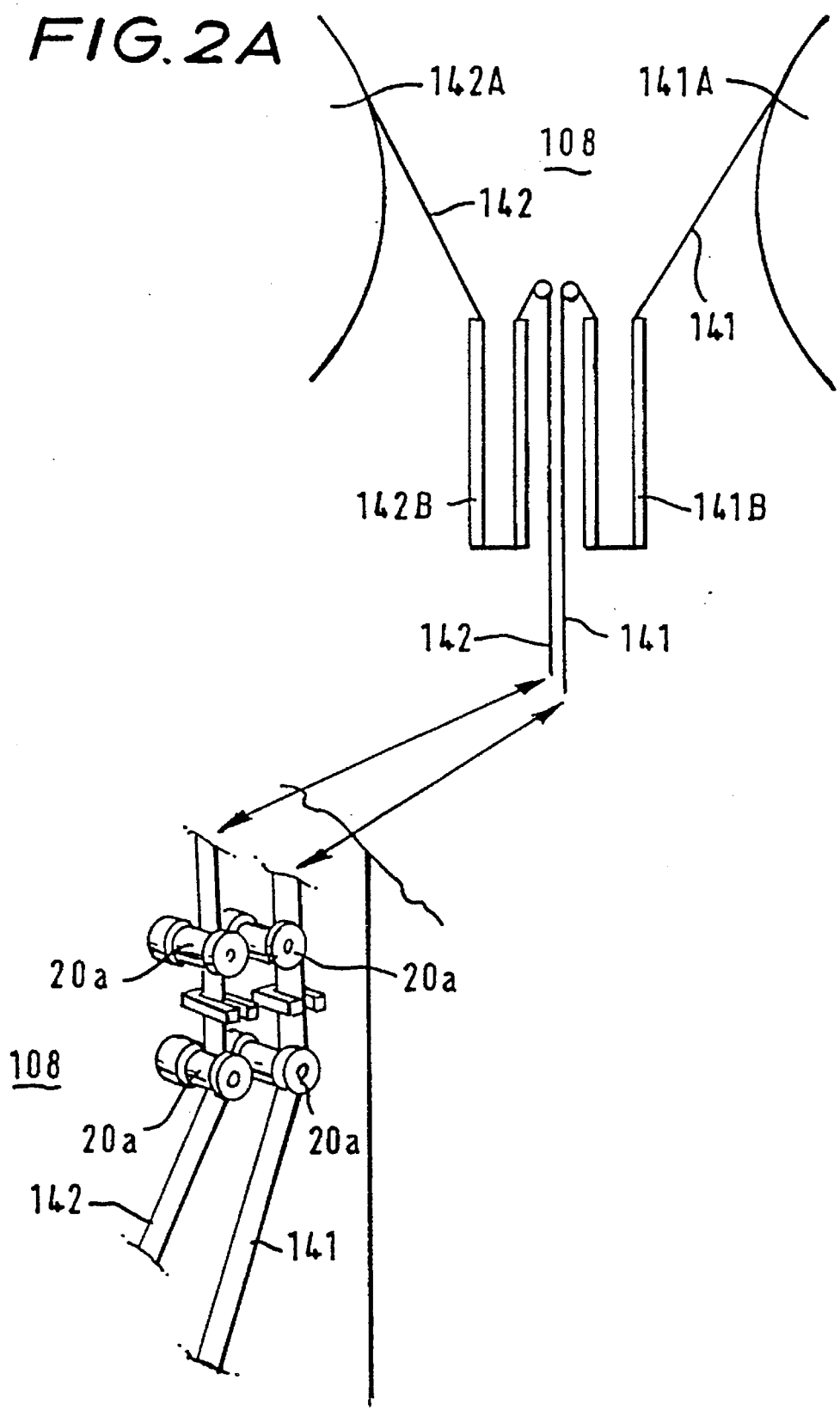
FIG. 2A shows as a perspective a part of the assembly shown in FIG. 2 and its relationship with a tape supply station shown diagrammatically (for ease of representation) as a face-on view of the face plate of the winding apparatus.
Figure 3:
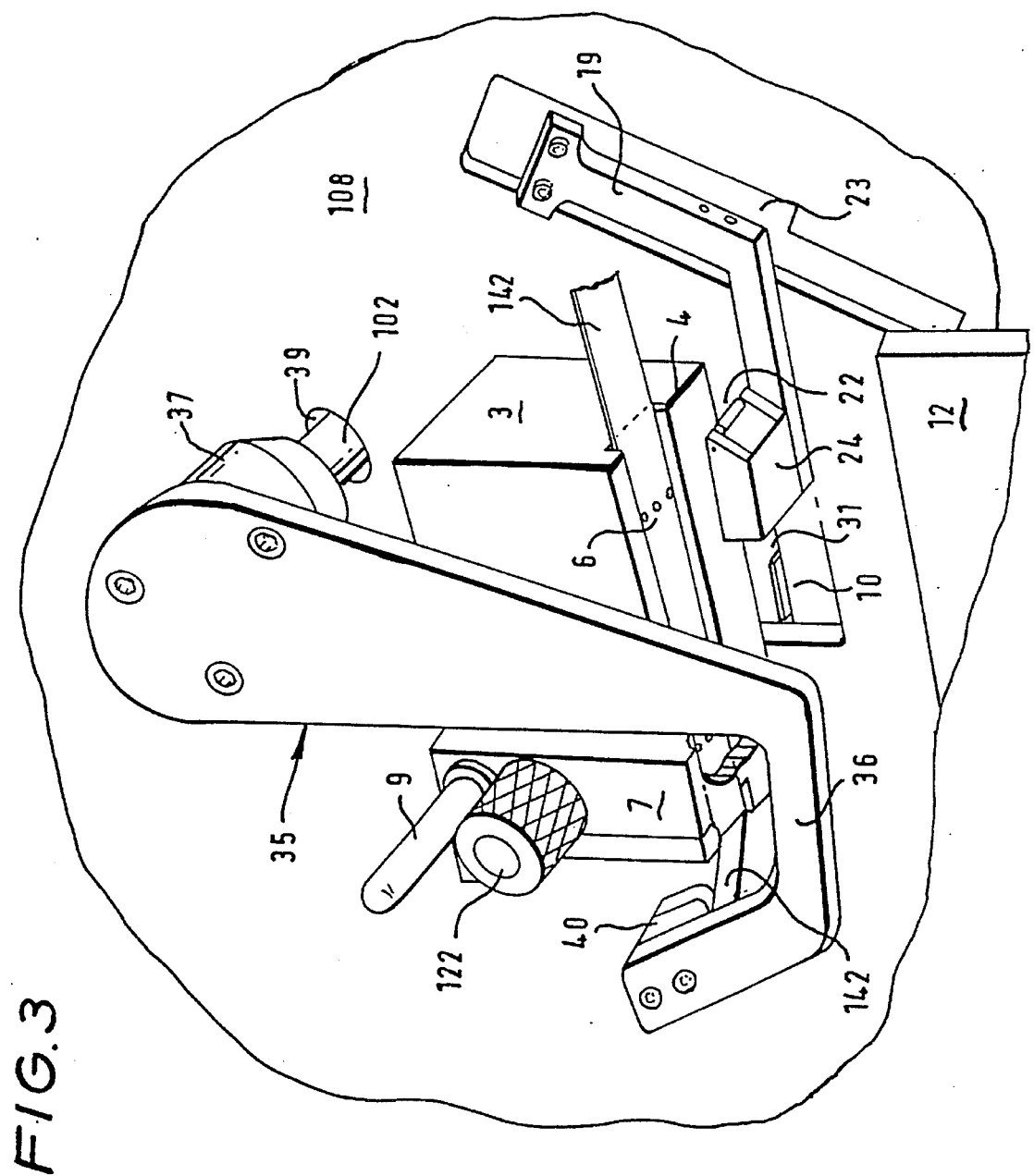
FIG. 3 shows, on an enlarged scale, part of the apparatus shown in FIG. 2, the lift arm having the position shown in FIG. 1 and the changeover arm being shown at its clockwise extremity.

The twin-pancake tape winding apparatus shown in the drawings comprises a face plate 108 mounted to a chassis (not shown), the face plate 108 assisting to define a housing (not shown) in which control means, electrical motive power means, a vacuum source and a pneumatic power source are all housed. The face plate 108 serves to mount various operating components both on the front face and the rear face thereof. Tape winders conventionally have a pancake support hub emerging from the face plate and feeding use tape to the tape winding path. In the case of the apparatus shown in the drawings, a pair of pancake drive hubs (not shown) are emergent frontwards from the face plate 108 so that a pair of pancake tape supply spools 141A amdnd 142A may be supported simultaneously so that use tape 141 or 142 can be directed to the tape winding path from two stores of tape successively via respective vacuum troughs 141B or 142B for tape tension control purposes. In FIG. 2, tape from a first pancake is shown at 142 entered in the tape winding path, tape 141 from a second pancake being ready awaiting the point where that from the first has been consumed into cassettes. As shown in FIG. 2, tape 141 is clasped by clasp 40. When tape 142 is almost consumed an audible warning sounds and clasping must take place at that time or before.

Securely mounted to the front face of face plate 108 is a fixed splicing block 3 and associated components together forming a splicing station 2. Splicing block 3 is a solid metallic block grooved on its under-surface with a longitudinal tape-receiving inverted groove 4 whose ceiling forms the tape splicing surface of the tape winder. Two sets of perforations open at the splicing surface to provide vacuum shoes 5 and 6 and are connected to a vacuum source referred to earlier (not shown) within the housing.

A tape slitting head 7 mounts a blade 8 and cooperates with the grooved undersurface of splicing block 3. Slitting head 7 is mounted for reciprocatory movement across the groove 4 perpendicular to the plane of face plate 108 by means of a fixed shaft 9 upon which the slitting head 7 is slidably mounted.

Slitting head 7 is also mounted to shaft 121, cap 122 securing the shaft 121 and head 7 together. A flange plate of shaft 121 has a coil spring 106 seated against it so that shaft 121 and extension tube 103 act against the compression of coil spring 106 when operated. Extension tube 103 is operated by pneumatic cylinder 104 supplied by a pneumatic power source in the housing, and more specifically by cylinder rod 124 reciprocating therefrom. A cross-groove (not shown) in splicing block 3 intersects groove 4 perpendicular thereto and in its plane to provide a path for the passage of blade 8 across groove 4 in slitting tape received on the splicing surface. In so-doing, blade 8 passes close to the surface of splicing block 3 between vacuum shoes 5 and 6 but without contacting the material of the block itself.

A splicing arm 10 operates through an orifice 31 in face plate 108 along a linear path of reciprocatory displacement beneath groove 4. Splicing arm 10 has a retracted position in which it is withdrawn into the housing through the splicing arm orifice 31 in the face plate 108 and an operating position in which the arm is displaced from the housing to apply a short length of splicing tape cut from a supply within the housing to abutting tape ends disposed on the splicing surface in groove 4. Splicing arm 10 is powered pneumatically from the air pressure source referred to earlier and operates in conventional manner known in the art, being fed with vacuum from the above-mentioned vacuum source. The splicing arm and its operation are described in more detail in UK Patent No 2091438.

Adjacent the base of face plate 108, a cassette holder 12 is mounted to a piston 41 and adjacent cassette lid opening arm 11. Piston 41 is operable enabling displacement of the cassette holder 12 under power from the pneumatic power source referred to earlier between a cassette-receiving position spaced slightly forward of the face plate 108 to facilitate charging of a V-zero cassette thereto and a cassette-holding position in which the cassette body is proximate the face plate 108 between inner and outer plates 13 and 14 of the cassette holder 12. At this latter position the cassette is ready for tape loading to begin.

Two driven shafts (not shown) within the housing terminate in drive couplings 15 and 16 provided for engagement with the hub sockets (not shown) of the two hubs of a V-zero cassette. With a V-zero cassette charged to the cassette holder 12 in the manner referred to earlier, drive couplings 15 and 16 engage the spool hub sockets, as the holder 12 is displaced rearwardly as mentioned above, an opening 17 in inner plate 13 of cassette holder 12 being provided to facilitate entry of drive coupling 15 into one cassette hub and a cut-off corner of inner plate 13 serving the same purpose in relation to drive coupling 16. The two shafts terminating in couplings 15 and 16 are powered from the electrical motive power means referred to earlier (ie a wind motor) in conventional manner.

Cassette holder 12 forms part of a cassette conveyor system well-known in the art whereby loaded cassettes are discharged from holder 12 by incoming cassettes from the direction A.

Face plate 108 is provided with an elongate slot 23. Slot 23 serves as a track for reciprocatory displacement of lift arm 19 parallel to face plate 108. Lift arm 19 has a cranked configuration providing a foot 24 having an upwardly facing vacuum shoe 22 connected by ducting (not shown) within lift arm 19 to a vacuum source within the housing of the tape winder. Lift arm 19 is also powered from a pneumatic power source provided in the housing of the tape winding apparatus, being coupled to a pneumatic piston-and-cylinder assembly and a ball slide to provide for the reciprocatory linear displacement.

Operating on the front face of the face plate 108 is a final guide assembly 25 comprising an eccentric plate 18 provided with a leader tape extraction arm 21. A bearing block 60 mounted to the rear face of face plate 108 houses a journal 61 into which a cylindrical boss 62 integral with plate 18 is received for rotation of plate 18 relative to face plate 108. An internal flange of boss 62 forms a toothed wheel 63. Toothed belt 64 connects toothed wheel 63 to the output of electrical motor 65 to provide power to drive plate 18.

A stroboscopic speed monitoring assembly 66 provided internally of the housing of the tape winding apparatus is represented diagrammatically only in the drawings since such devices are well known in the tape winding art. The assembly internally of the housing includes a shaft 67 received within cylindrical boss 62 of plate 18 and terminating externally in a strobe wheel 20 of conventional construction. Shaft 67 mounts wheel 70 disposed for rotation in block 71 but otherwise fixed therein. Shaft 67 is mounted for driven rotation in response to contact of strobe wheel 20 with mobile tape during tape winding. Additionally, shaft 67 is mounted for reciprocatory linear displacement with block 71 on the axis of rotation of strobe wheel 20 so that the strobe wheel 20 has a retracted position in the plane of face plate 108 and an exposed position in which it is forward of face plate 108 and disposed in the tape winding path. Block 71 of the stroboscopic tape speed monitoring assembly 66 has dependent blocks 68 and 69 secured thereto and slidably mounted, respectively, to rails 72 and 73 to facilitate the linear displacement just described, rails 72 and 73 both being secured to the rear face of face plate 108. Pneumatic cylinder 74 has a piston acting against block 71, cylinder 74 being mounted to place 74C.

Changeover arm assembly 35 comprises a cranked changeover arm 36 mounted to a cylindrical sleeve 37 secured to the end of shaft 102, the latter passing through an orifice 39 in face plate 108 of the tape winding machine. A bearing block 107 (FIG. 17) is mounted somewhat adjacent shaft 121 of extension tube 103 to the rear face of face plate 108 within the housing of the tape winding machine and receives shaft 102 journalled therein for rotational and axial displacement. Similarly, shaft 102 is received in bearing block 118 for rotational displacement therein. Bearing block 118 is mounted to plate 130 straddling a pair of bearing blocks 119. The latter are mounted for axial displacement on shafts 120. Shafts 120 are received at their front extremities in bearing block 107 and secured at their rear extremities to plate 126 forming part of the chassis of the tape winding machine. A pneumatic cylinder 105 and a related cylinder rod 125 are responsible for axial displacement capability upon the shafts 20 of bearing block 118 in the company of plate 130 and bearing blocks 119, the rod 125 connecting to a rear face of bearing block 118 in order to achieve such displacement. Secured to shaft 102 and restrained from axial and rotational displacement relative to shaft 102 is a boss mounting a toothed wheel 128 coupled by means of toothed belt 117 to toothed wheel 127. The latter forms the output of electric motor 116 which is secured to plate 130 together with bearing blocks 119 and bearing block 118. Boss 114 is also secured to shaft 102 and restrained from axial and rotational displacement relative thereto, boss 114 having a face confronting bearing block 107 and formed with a diametric tongue 101 engageable in a complementary diametric slot (not shown) formed in a metallic pressure pad 100 registered with boss 114 and having a circular form matching the size of the circular form of boss 114. Of course, both tongue 101 and the corresponding slot in pressure pad 100 are interrupted by an opening to receive shaft 102 through the boss 114, the pressure pad 100 and into the bearing block 107.

An opto vein 129 extends beyond the periphery of boss 114 over a 180° extent of the circumference of boss 114 so as to interrupt an optical beam generated by opto transmitter 112 in the direction of opto receiver 111, opto transmitter 112 and opto receiver 111 being mounted to opto bracket 110 mounted to plate 130. Signal lead 109 transmits signals from the opto receiver to the tape winder control system signifying the presence or absence of the opto vein as an obstacle between the opto receiver 111 and opto transmitter 112 in order thereby to signify the disposition of the changeover arm in the event, for example, of an emergency shut-down of the tape winder.

Plate 131 straddles shaft 120 and is secured to each bearing block 119. Plate 131 mounts plunger 103 referred to earlier. Changeover arm 36 is provided at its extremity with clasp 40.

Clasp 40 comprises a barrel 241 received in a sleeve 242, a cylindrical tape contact surface being provided by the barrel 241 between a pair of axially opposed annular enlargements 134 and 135. Quadrant 133 forming part of barrel 241 has a pair of depressions 243 and 244 on its under-surface 245. A pair of coil springs 138 are received respectively in depressions 243 and 244. Similar depressions 246 and 247 are formed in face 148 of barrel 241 and are registered with depressions 243 and 244 so that coil springs 138 can be accommodated in barrel 241. In the assembled clasp, of course, it is quadrant 133 which provides the cylindrical tape contact surface just referred to above. A pair of wedges 149 abut quadrant 133 leaving exposed therebetween a portion of the tape-contacting surface smaller in width than the width of the use tape. The compressive resistance of the coil springs 138 is such that manual downward pressure of tape upon the quadrant 133 depresses the quadrant 133 whereby the tape dishes across its width as it is urged down the inclined surfaces of the wedges 149 and can flip outwardly, once the wedges 149 have been cleared, into the spacing between the wedges 149 and the displaced quadrant 133. The compression of coil springs 138 urges the quadrant 133 upwardly to nip the tape in that space once downward tape pressure is released.

In operation of the tape winder shown in the drawings, tape 142 issued from vacuum trough 142B (through which it is threaded previously) is first manually grasped by its end, disposed upon the curved surface of quadrant 133 of clasp 40 and urged downwardly so as to compress coil springs 138 and thus depress quadrant 133 radially inwardly of the barrel 241. The vacuum trough is in operation at this point. The tape 142 suffers concurvature as a result of its lateral margins abutting wedges 149. Continued downward pressure on tape 142 results in the marginal edges of tape 142 clearing the wedges 149. The tape then flips outwardly becoming restored to its essentially planar condition and occupying the small gap between the underside of each of wedges 149 and the curved upper surface of quadrant 133. Relaxation of the pressure applied to tape 142 allows the compressive forces in coil springs 138 to recover substantially the original position of quadrant 133 with the result that tape 142 is nipped between the upper curved surface of quadrant 133 and the undersides of each wedge of the pair of wedges 149. In this manner, the tape 142 is securely clasped by clasp 40 in readiness for transfer to splicing station 2 by changeover arm 36. At this point, the state of the apparatus is essentially as shown in FIG. 2 of the drawings.

Figure 4:
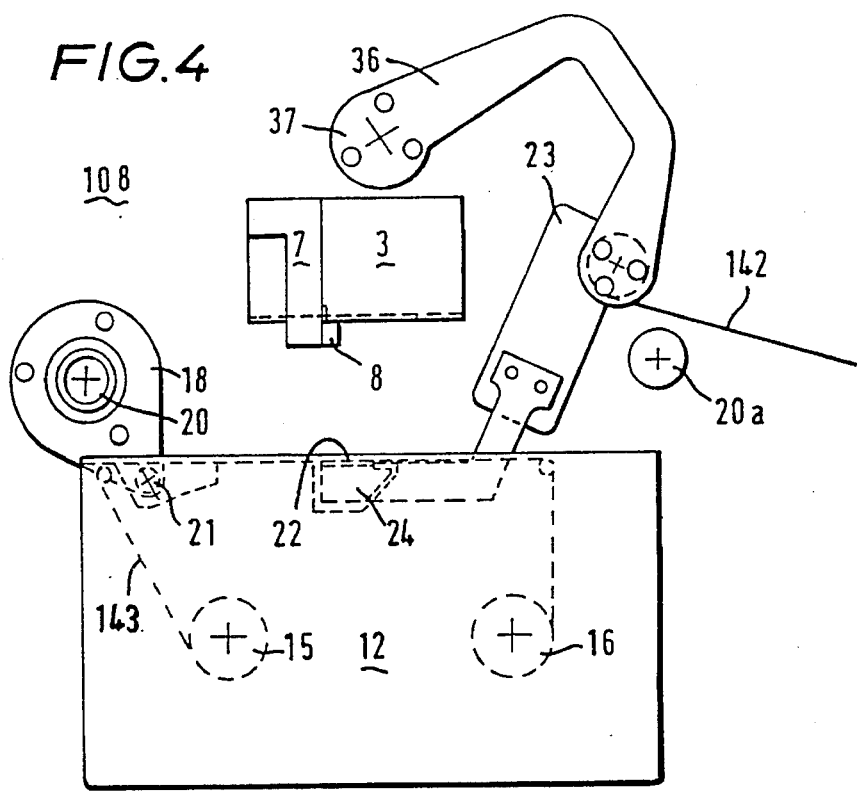
FIG. 4 shows the splicing station of the apparatus at a pre-extraction first stage of the operating sequence involved in loading a V-zero cassette, use tape being held by the changeover arm preparative to disposition on the splicing surface.
Figure 17:
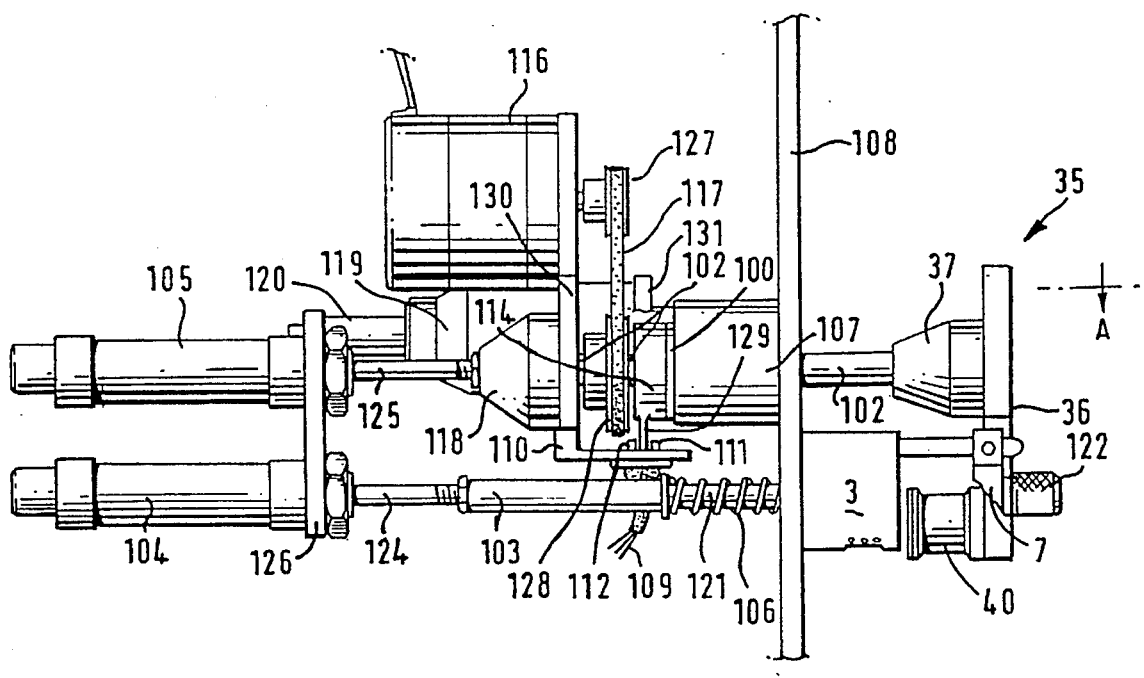
FIG. 17 is a cross-section through the face plate of the tape winder shown in FIG. 2 of the drawings taken vertically through the face plate just to the left of the splicing block as represented in FIG. 2, the changeover arm being in the position shown in FIG. 16.
Figure 22:
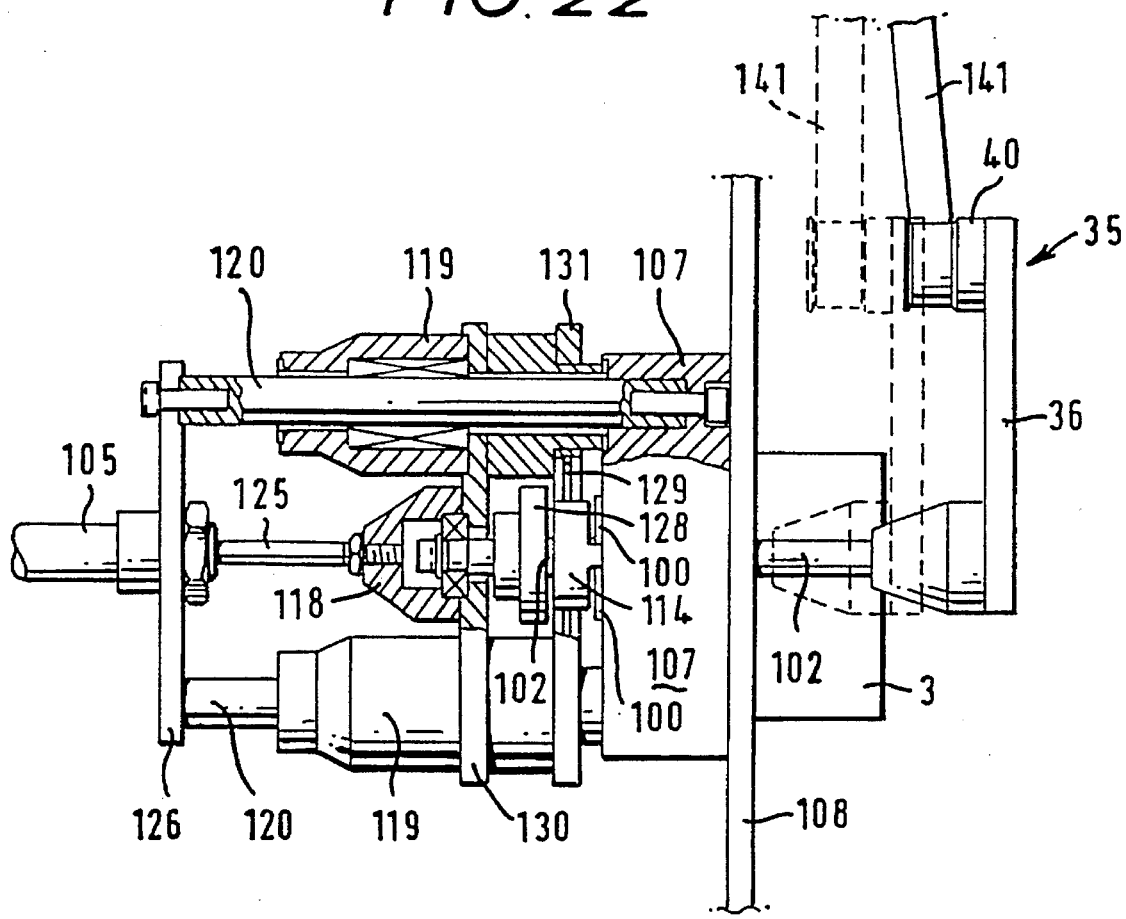
FIG. 22 is a view in the direction of the arrow A shown in FIG. 17 with some components shown in cross-section.
Figure 23:
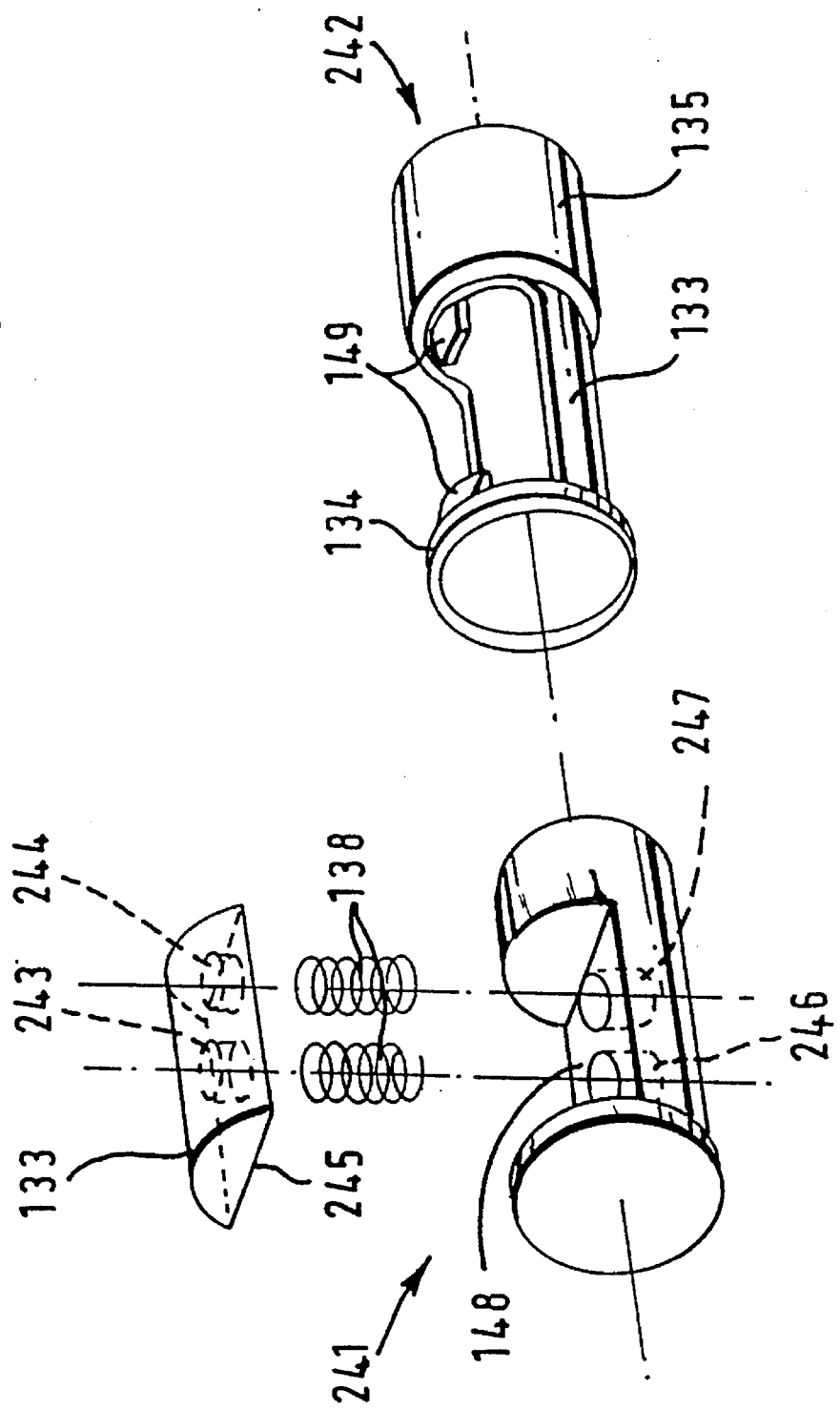
FIG. 23 is an exploded view of the changeover arm clasp shown in simplified form in FIG. 22 and various others of the earlier figures.

A cassette is then charged to cassette holder 12 which, as shown in FIG. 2, is in cassette-receiving position spaced slightly forward of face plate 108. Operation of piston 41 restores cassette holder 12 to a cassette-holding position in which the cassette is proximate face plate 108, drive couplings 15 and 16 engaging in the hub sockets of the two cassette hubs. At this point, final guide assembly 25 is in its rest position with leader tape extraction arm 21 received through an aperture in the cassette so that it is disposed immediately beneath the bridge of tape 143 passing between the input and output mouths of the cassette. Similarly, lift arm 19 is at the lower extremity of its reciprocation, foot 24 similarly being received in an aperture in the cassette with vacuum shoe 22 immediately beneath the tape bridge. The machine state at this point is in simple terms as shown in FIG. 4 and in more detail as represented in FIGS. 17 and 22.

Assuming the somewhat idealized situation of a new winder not previously used (for purposes of illustration), the splicing surface carries no tape at this point. The control functions of the tape winder now call for displacement of the changeover arm assembly 35. Pneumatic cylinder 105 operates to draw rod 125 toward the cylinder 105 (ie in a left hand direction with reference to FIGS. 17 and 22). Rod 125 pulls with it bearing assembly 118 and the plate 130 to which it is mounted. Shaft 102 is carried in the same direction together with toothed wheel 128 and boss 114 both secured thereto. This axial displacement withdraws tongue 101 from the pressure pad slot and thus restores the capacity of shaft 102 to rotate. In this condition, the axial displacement of shaft 102 and its supported components is as shown in FIG. 19.

Figure 5:
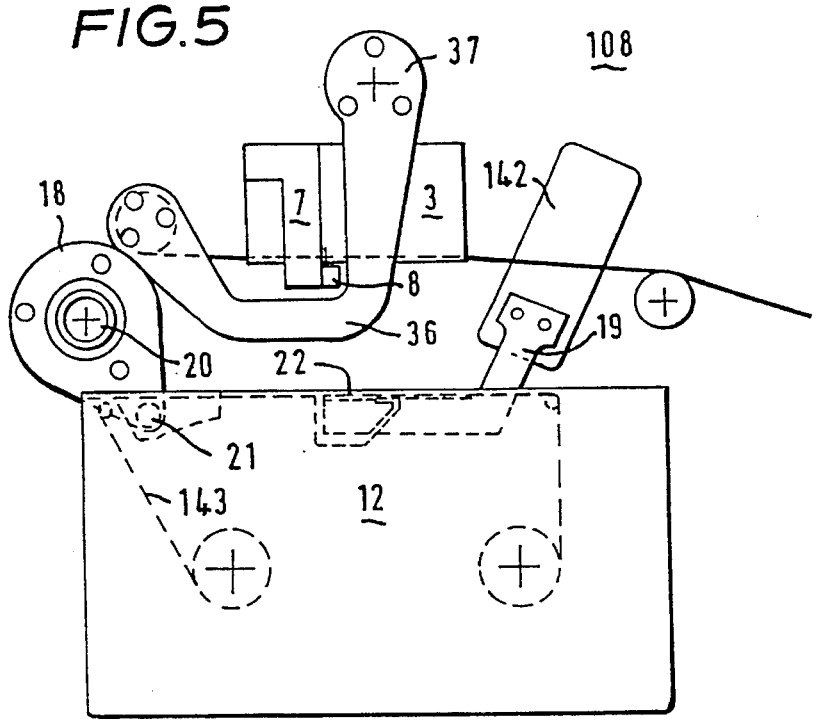
FIG. 5 shows the splicing station of the apparatus in a second stage of the operating sequence involved in loading a V-zero cassette, use tape having been disposed on the splicing surface by the changeover arm.

Electrical stepper motor 116 (FIG. 17) is now actuated causing toothed wheel 127 to rotate in a clockwise direction, the rotational sense referred to being as viewed from the front face of face plate 108. Rotation of toothed wheel 127 drives toothed belt 117 and causes corresponding clockwise rotation of toothed wheel 128. Fixture of toothed wheel 128 and its related boss to shaft 102 transmits the rotational drive of motor 116 to shaft 102 and via cylindrical sleeve 37 of changeover arm assembly 35 to changeover arm 36. This drives clasp 40 at the extremity of changeover arm 36 in a clockwise sweep beneath splicing station 2 until it reaches a limit displacement as represented in FIG. 5 with clasp 40 disposed immediately adjacent final guide assembly 25. The position is shown more simply in FIG. 18 and in the context of the position of shaft 102 and its supported components, as mentioned earlier, in FIG. 19.

Figure 18:
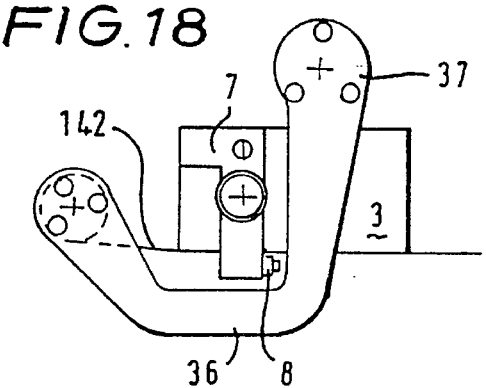
FIG. 18 is a view similar to FIG. 16 but showing the changeover arm in the position represented in FIG. 5 of the drawings.
Figure 19:
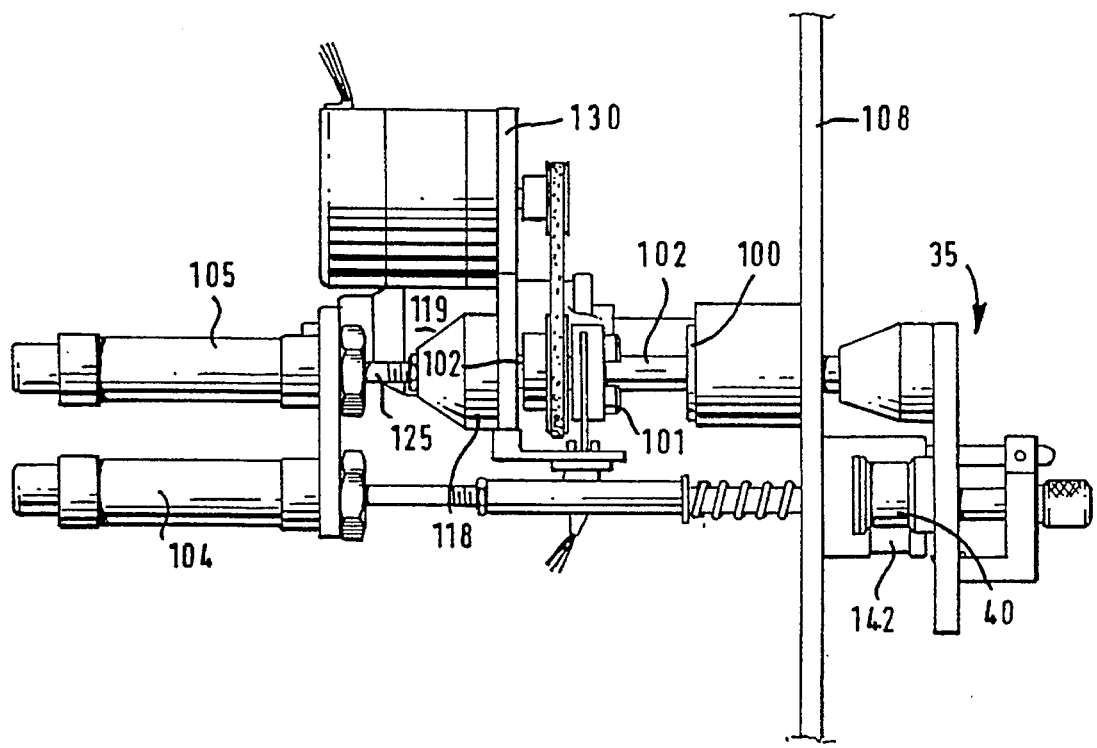
FIG. 19 is a cross-section similar to that shown in FIG. 17 but showing the changeover arm in the position represented in FIG. 18.

Referring to FIG. 19 of the drawings, it will be appreciated that the above-described leftward axial displacement of shaft 102 aligns the tape-contacting surface of clasp 40 with the splicing surface represented by the base of groove 4 in splicing block 3. Accordingly, as shown in FIGS. 5, 18 and 19 of the drawings, tape 142 is disposed in groove 4 as a result of the rotational displacement clockwise of changeover arm 36.

Figure 21:
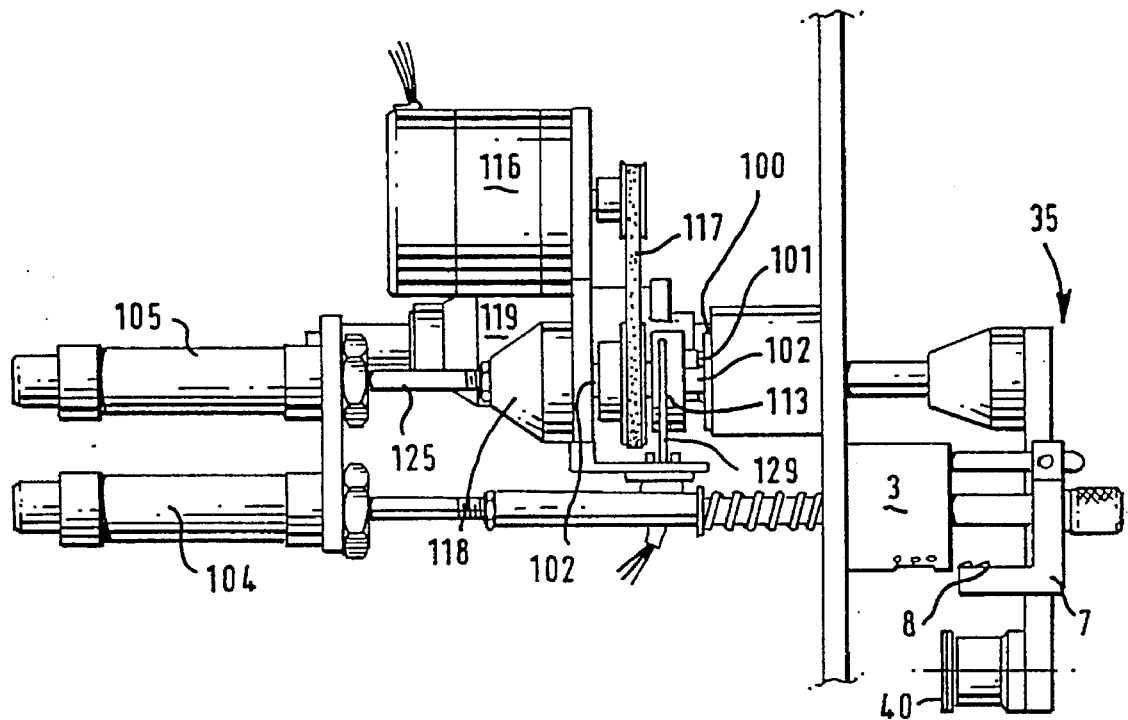
FIG. 21 is a cross-section similar to that shown in FIGS. 17 and 19 but showing the changeover arm in the position represented in FIG. 20.

Vacuum is at this point supplied to vacuum shoe 6 in groove 4 to retain tape 142 on the splicing surface by suction. Similarly, vacuum is supplied to vacuum shoe 5. Tape slitting head 7, as shown in each of FIGS. 17, 19 and 21, is maintained with blade 8 stationary to the remote side of splicing block 3 to face plate 108, pneumatic pressure in pneumatic cylinder 104 acting through cylinder rod 124 and extension tube 103 on shaft 121 for this purpose. With tape 142 secured on the splicing surface of splicing block 3 by vacuum shoes 5 and 6, pneumatic pressure in pneumatic cylinder 104 is released allowing snap recovery of coil spring 106 drawing shaft 121 left in the sense shown in FIG. 17 and thus drawing blade 108 through the cross groove in splicing block 3 to sever the tape 142 into upstream and downstream portions. The upstream portion remains secured to the splicing surface by operation of vacuum shoe 6 whilst vacuum ceases to be applied to vacuum shoe 5 so that the downstream portion of tape 142 is secured only by its retention in clasp 40.

Pneumatic cylinder 105 is now operated to cause left-to-right displacement of the shaft 102. This axial displacement of shaft 102 is limited by contact between tongue 101 and the planar surface of pressure plate 100 as is represented by the relation between these components in FIG. 21 of the drawings. Once the changeover arm assembly 35 has been displaced outwardly from face plate 108 in this way so as to clear the splicing station, it commences its anti-clockwise displacement. Simultaneously, lift arm 19 is reciprocated upwardly in slot 23 as plate 18 suffers anti-clockwise displacement.

Figure 6:
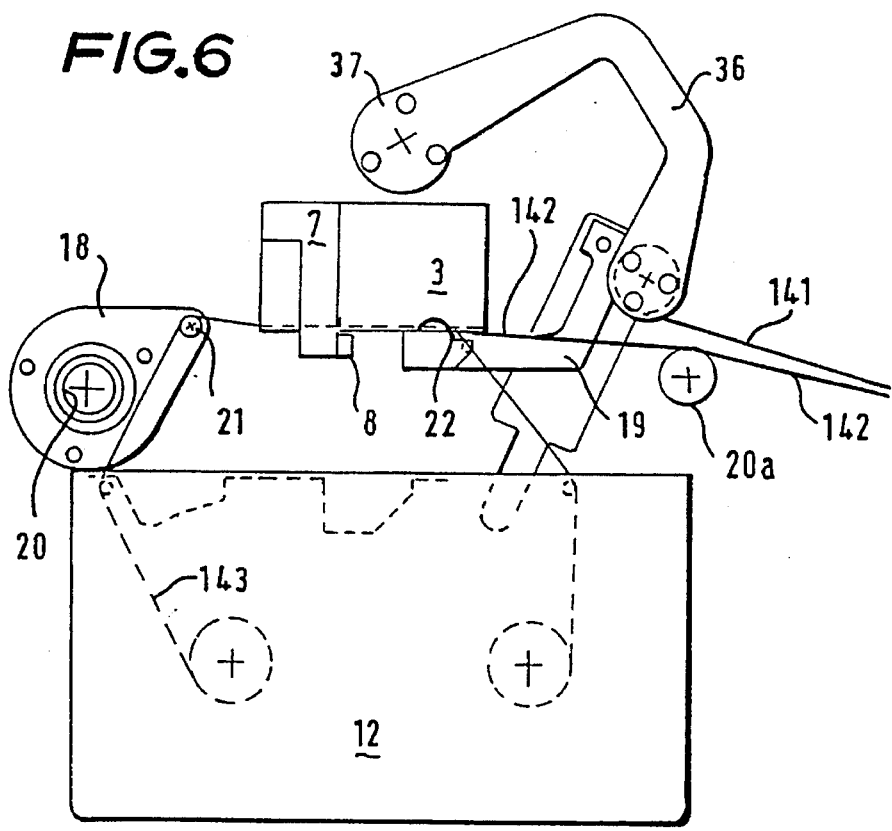
FIG. 6 shows the splicing station of the apparatus at a third stage of the operating sequence involved in loading a V-zero cassette, leader tape having been extracted from the cassette by the extractor arm and superimposed upon the use tape on the splicing surface.
Figure 7:
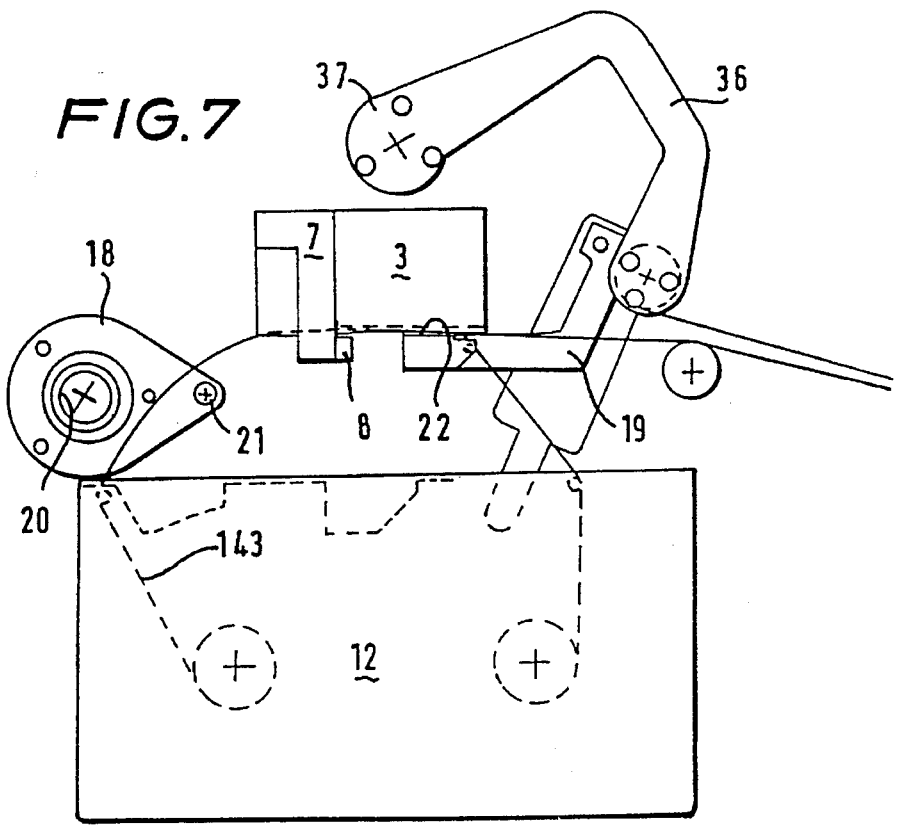
FIG. 7 shows the splicing station of the apparatus at a fourth stage of the operating sequence involved in loading a V-zero cassette, the extractor arm having displaced so that the leader tape is slack preparative to cutting and splicing and retained by vacuum on the splicing surface.
Figure 20:
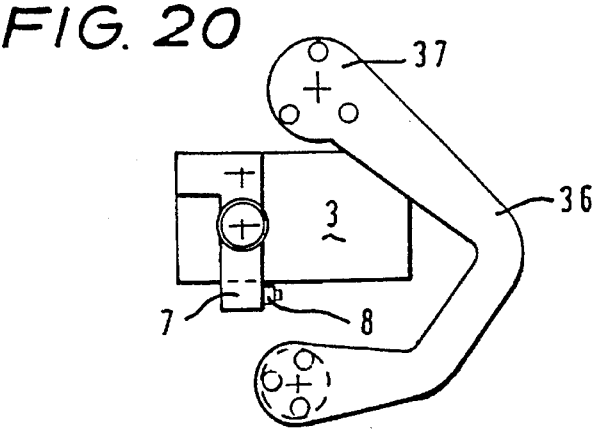
FIG. 20 is a view similar to FIG. 18 but showing the changeover arm in a position intermediate the positions shown in FIGS. 4 and 5 of the drawings.

In FIG. 21, the changeover arm assembly 35 is shown displaced to an intermediate position represented more clearly in FIG. 20 as a result of the above-mentioned anti-clockwise rotational displacement of changeover arm 36 such displacement, of course, being responsive to stepper motor 116 and connection of its drive via toothed wheel 127, toothed belt 117 and toothed wheel 128 to shaft 102. The reciprocation of lift arm 19 and rotation of plate 18 both mentioned above, cause leader tape 143 bridging between the input and output mouths of the cassette to be extracted by leader tape extraction arm 21, the two operations running in parallel and the leader tape 143 being presented as a loop to the splicing surface represented by the base of groove 4 in splicing block 3. As shown in FIG. 6 of the drawings, the leader tape becomes disposed on the splicing surface and, of course, overlies the upstream portion of use tape 142 which continues to be retained on the splicing surface by operation of vacuum shoe 6. Vacuum shoe 5 is at this point reactivated and plate 18 suffers slight clockwise rotation to release leader extractor arm 21 from the leader tape 143, rendering the leader tape slightly slack preparative for cutting. Tape slitting head 7 then operates again in the manner described earlier, slitting the leader tape into upstream and downstream portions along a line of cut corresponding precisely to the cut leading edge of the underlying upstream portion of use tape 142. The machine state at this point is as represented in FIG. 7 of the drawings.

Figure 16:
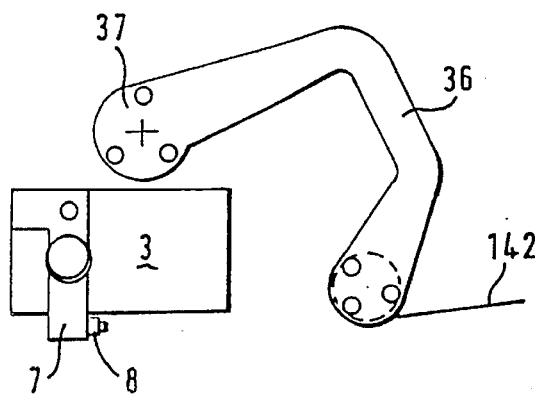
FIG. 16 shows in simplified form the changeover arm in the position represented in FIG. 4 of the drawings.

Continued anti-clockwise rotation of changeover arm 36 restores the changeover arm assembly 35 to the position represented in FIGS. 6 and 17 of the drawings and shown more simply in FIG. 16. The anti-clockwise stop in the rotation of changeover arm assembly 35 is represented by registration between tongue 101 and the complementary diametric slot formed in metallic pressure pad 100. At this point, of course, axial force along shaft 102 urges tongue 101 into the above-mentioned diametric slot to produce the machine state represented in FIG. 17.

Whilst maintaining both vacuum shoe 5 and vacuum shoe 6 active, lift arm 19 is lowered after activating vacuum shoe 22 on foot 24 of the lift arm 19. Lift arm 19 therefore carries the upstream tail of leader tape 143 upon vacuum shoe 22 leaving the upstream portion of use tape 142 retained on the splicing surface by vacuum shoe 6 in end-to-end abutment with the downstream portion of leader tape 143 retained on the splicing surface by vacuum shoe 5. Splicing arm 10 then emerges through orifice 31 in face plate 108 and applies a block of splicing tape over the above-mentioned abutting tape edges as shown in FIG. 8. Vacuum shoes 5 and 6 are then deactivated.

Whilst this sequence of operations is taking place, plate 18 rotates in anti-clockwise displacement whereby leader extraction arm 21 is again brought into contact with the leader tape, displacing the loop of leader tape so as to circulate about the locus of the retracted strobe wheel 20.

Figure 10:
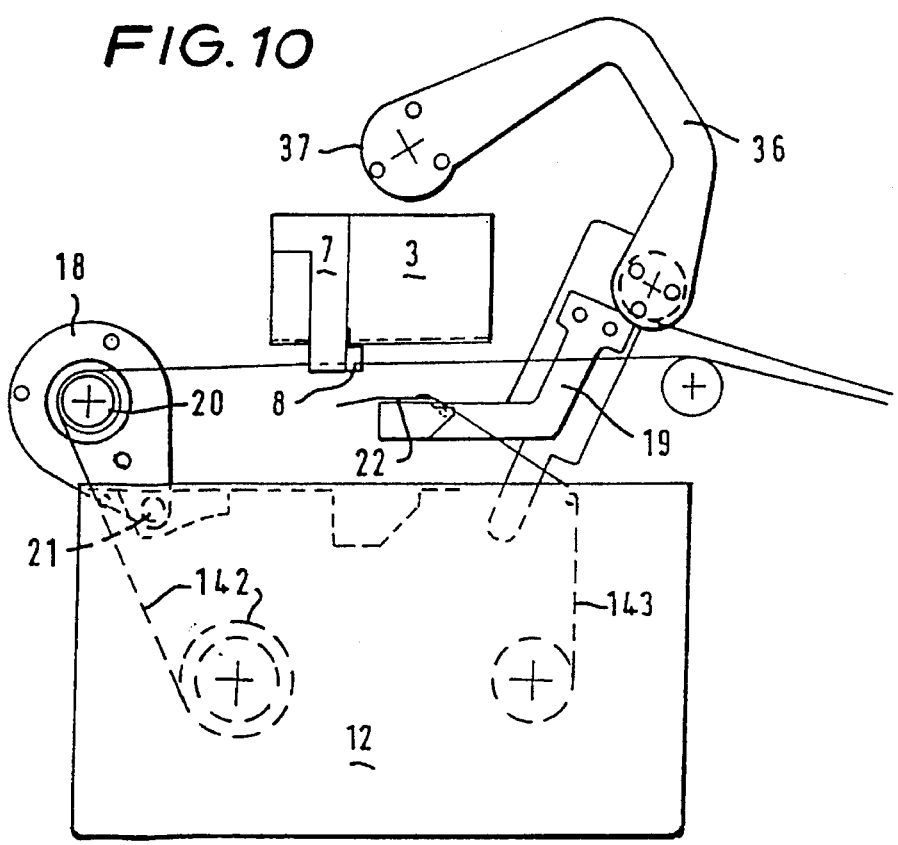
FIG. 10 shows the splicing station of the apparatus at a seventh stage of the operating sequence involved in loading a V-zero cassette, the tape being shown spaced further from the splicing surface as a result of release of the tape by the leader extractor arm to the final tape guide, winding of the tape onto the left hand hub of the cassette having already commenced.

At any convenient point once the changeover arm assembly 35 has been restored to its anti-clockwise stop (and, of course, is disposed to one side of the tape winding path of tape 142), tape 141 from the second tape store of the tape winder can be secured to the clasp 40 in the manner already described, the remnant end of tape 142 being first discarded. Tape 141 is shown secured to clasp 40 in FIG. 6. It will be noted that the same is shown in FIG. 2 which shows also that the tape paths for the two tapes 141 and 142 cross although occupying different planes. With the machine state as represented in FIG. 9 of the drawings, strobe wheel 20 is driven forward of face plate 108 by actuating pneumatic cylinder 74 so that its piston acts upon block 71 to drive sliding displacement of the assembly 70, 71, 68, 69, 74A, 74B on rails 72 and 73. With the strobe wheel 20 proud of the face plate 108 as shown in FIG. 10 of the drawings, leader tape 143 is released by leader extraction arm 21 to the surface of the strobe wheel 20, drive is applied to drive shaft 15 and use tape 142 is wound along the tape path shown in FIG. 10 onto the left-hand hub of the cassette.

Figure 11:
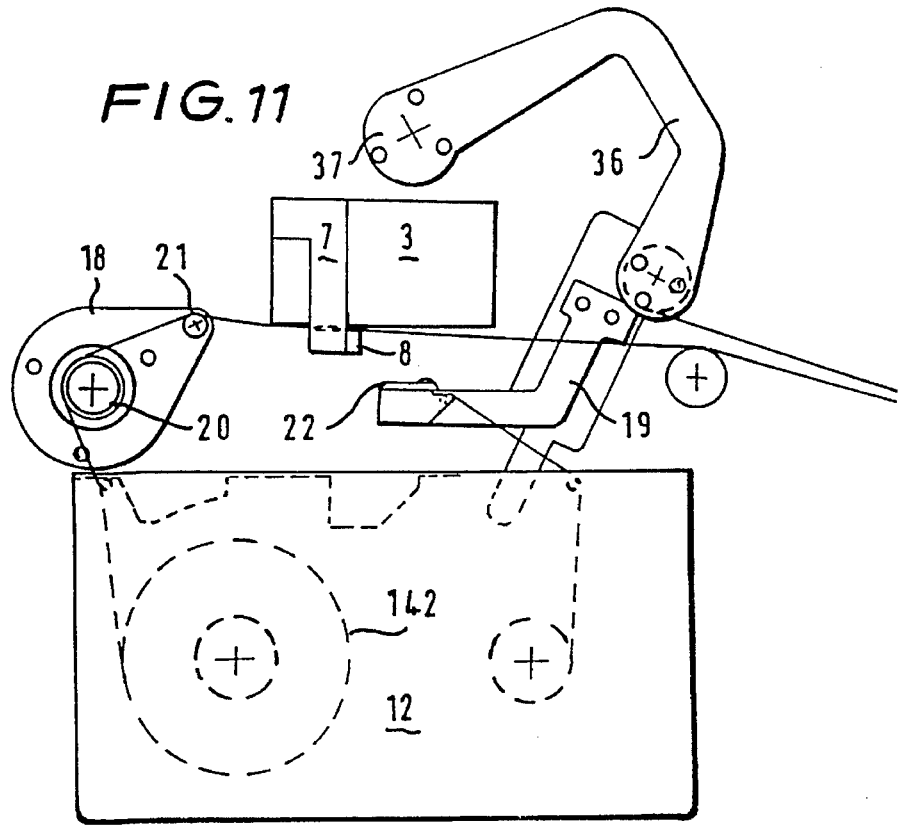
FIG. 11 shows the splicing station of the apparatus at an eighth stage of the operating sequence involved in loading a V-zero cassette, winding having been completed and use the tape being offered up to the splicing surface by operation of the leader extractor arm.

When a pre-determined amount of use tape has been wound into the cassette (as shown by the tape wound on the left-hand spool in FIG. 11 of the drawings), drive to the drive coupling 15 is ceased and plate 18 is rotated anti-clockwise until leader extraction arm 21 engages the use tape 142, disposing the use tape 142 in the groove 4 of splicing block 3 as shown in FIG. 11. At this point, of course, strobe wheel 20 remains proud of face plate 108 and is in contact with use tape 142.

Figure 12:
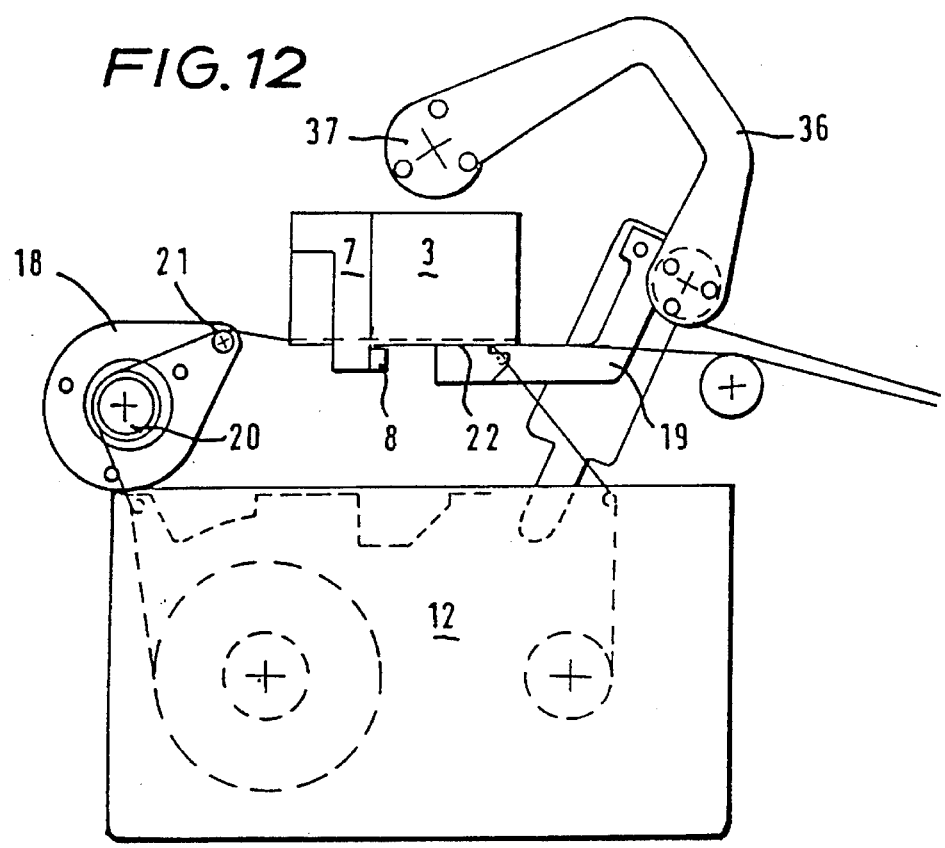
FIG. 12 shows the splicing station of the apparatus at a ninth stage of the operating sequence involved in loading a V-zero cassette, the leader tape upstream tail being shown superimposed by the lift arm over the use tape on the splicing surface.
Figure 13:
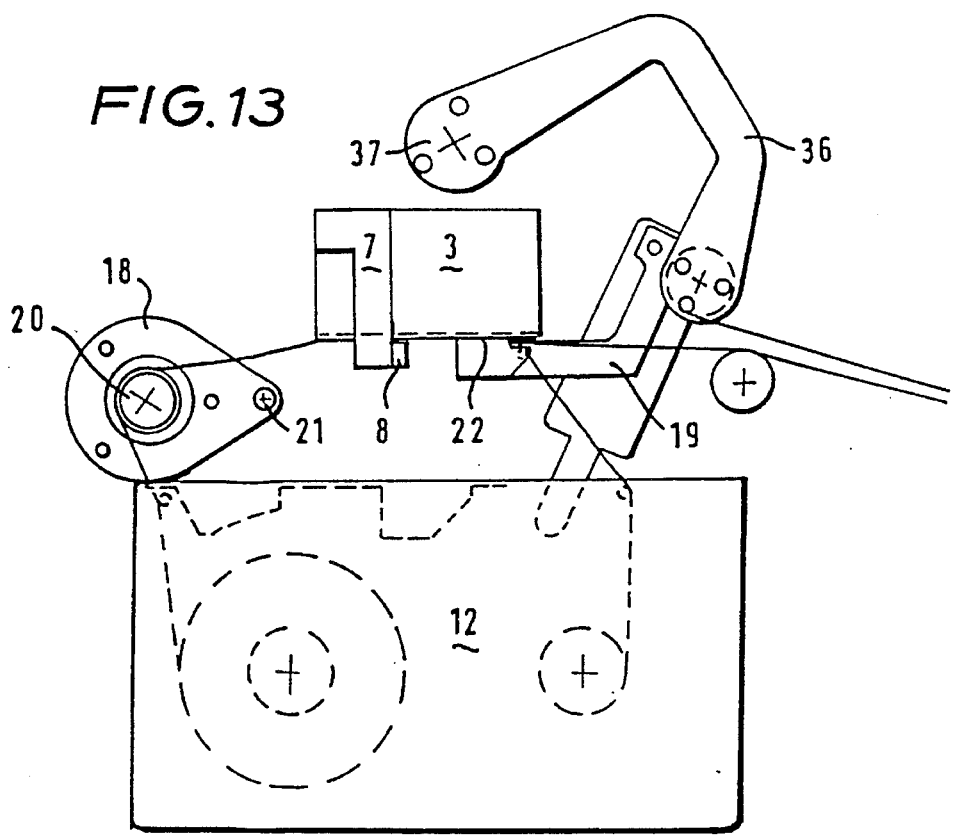
FIG. 13 shows the splicing station of the apparatus at a tenth stage in the operating sequence involved in loading a V-zero cassette, the use tape having been slackened preparative to cutting and splicing as a result of release of the use tape by the leader extraction arm.

As shown in FIG. 12, lift arm 19 is at this point caused to elevate in its track 23, thus raising the upstream tail of leader tape 142 referred to earlier into superimposition upon the use tape 142, both use tape 142 and the upstream portion of leader tape 143 at this point being disposed in groove 4. Vacuum shoes 5 and 6 are now reactivated. Rotation of plate 18 slackens the tape as shown in FIG. 13. Slitting head 7 then operates in the manner previously described and in so doing severs through the use tape in groove 4. The line of cut corresponds to the cut leading edge of the upstream portion of leader tape 143. Splicing arm 10 then operates once more in the manner previously described to apply a block of splicing tape over the abutting ends of use tape and leader tape tail retained in groove 4. The machine state is then as shown in FIG. 13 of the drawings, strobe wheel 20 at this point being in contact with the use tape and leader extraction arm 21 being out of contact with the use tape.

Figure 14:
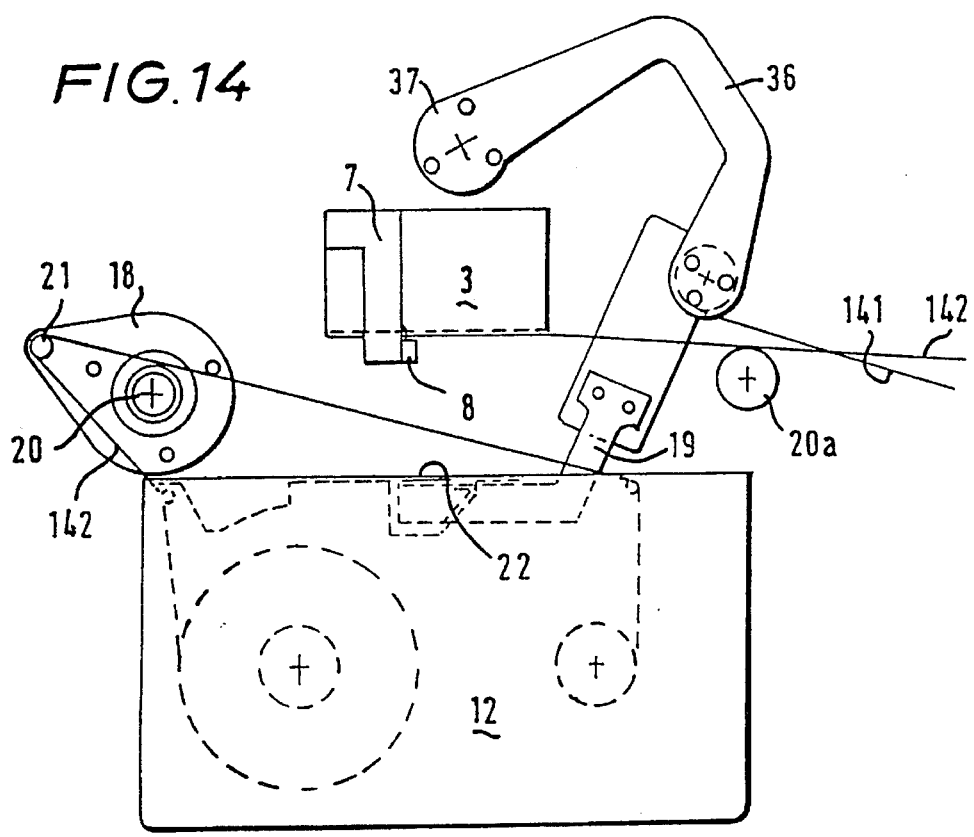
FIG. 14 shows the splicing station of the apparatus at an eleventh stage of the operating sequence involved in loading a V-zero cassette, the use tape having been cut, and spliced on the splicing surface to the superimposed upstream leader tape tail, and the leader extraction arm having been rotated to release the tape from the final guide.
Figure 15:
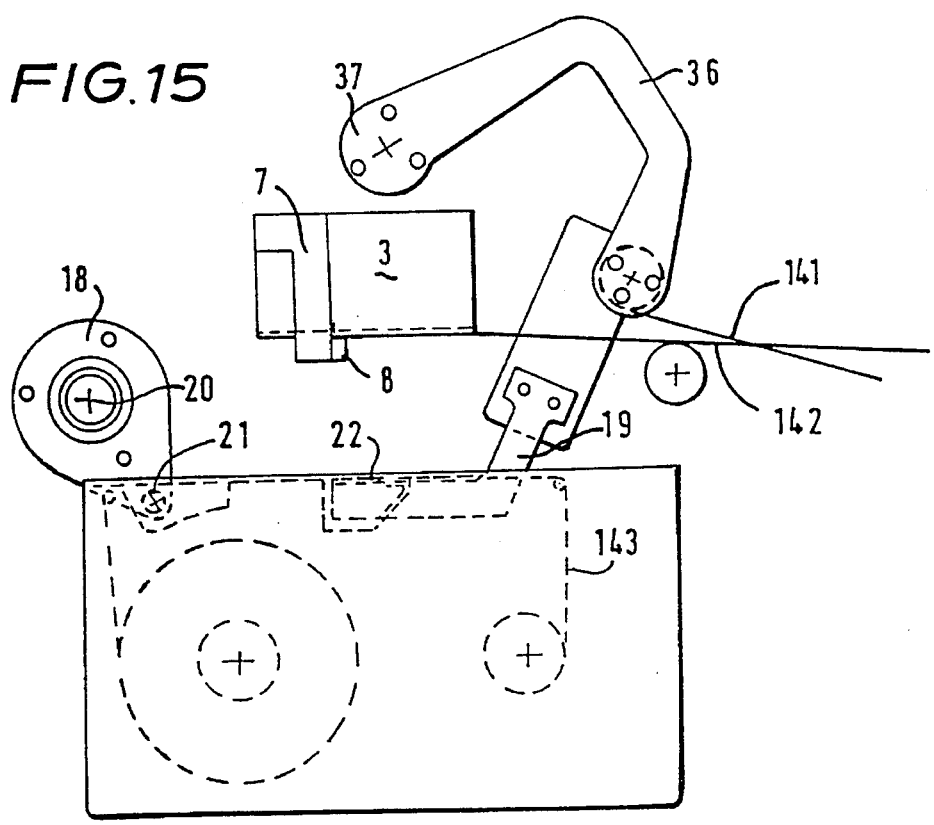
FIG. 15 shows the splicing station of the apparatus at a twelfth stage of the operating sequence involved in loading a V-zero cassette, slack tape having been taken up into the cassette and the cassette being ready for ejection.

The use tape and leader tape having been spliced, lift arm 19 is lowered to cassette mouth level as shown in FIG. 14, vacuum shoes 5 and 6 are deactivated and plate 18 is rotated anti-clockwise to the point where it supports the use tape 142 clear of the strobe wheel 20. Displacement of assembly 70, 71, 68, 69 on rails 72 and 73 reciprocally with respect to the axial displacement thereof described earlier retracts the strobe wheel 20 through the plane of the face plate 108. Plate 18 then rotates in a clockwise direction whilst at the same time drive is connected to drive coupling 15 to draw slack tape into the cassette. Plate 18 reaches a stop with leader extraction arm 21 received in the appropriate aperture of the cassette. The machine state is at this point as shown in FIG. 15 of the drawings. Piston 41 is now activated to restore cassette holder 12 to its cassette-receiving position forward of face plate 108. This frees the cassette of all encumbrances and it is then discharged from holder 12 to a cassette conveyor by means of the cassette discharge system referred to earlier. A fresh cassette is then charged to cassette holder 12 and the above loading operation is repeated.

When the store of tape 142 has been depleted to the point where it no longer contains sufficient use tape to load a further cassette, the upstream tail of use tape 142 which remains on the splicing surface of splicing block 3 after completion of the loading of a cassette and its discharge from cassette holder 12 is drawn back onto the tape store (ie pancake spool 42A). Changeover arm assembly 35 is then operated in the manner already described so that tape loading may continue from the fresh store of use tape 141. Of course, at this point, the depleted store of tape 142 is replaced by a further store in readiness for depletion of the store of tape 141.

It is a useful exercise to consider splicing station activity in relation, for comparison purposes only, to a single-pancake tape winder counterpart to the twin-pancake winder which is the subject of FIGS. 1 to 24. Such a single-pancake loader or winder is shown in FIGS. 25a to 25i.

In operation of that apparatus, the leading end of magnetic tape 142 is first guided around a capstan and guide system to the splicing station 2 where it is held in position by means of vacuum supplied to each of vacuum shoes 5 and 6. Slitting head 7 then operates and the tape end cut off by the blade thereof is removed and discarded.

A V-zero cassette is then loaded to cassette holder 12 and the holder 12 then displaced inwardly on piston 41.

Leader extraction arm 18A (whose counterpart in FIG. 2 it will be appreciated is final guide assembly 25 comprised of plate 18 and extraction arm 21) and lift arm or tape extraction arm 19 are then energized and move to the top of their strokes. The effect of this is to extract leader tape 143 and dispose it in groove 4 so that the leading end of magnetic tape 142 is spaced about 0.25mm from the surface of the leader tape (FIG. 25b), the vacuum shoe 22 of lift arm 19 at the top of its stroke falling similarly short of the downwardly facing surface or ceiling of groove 4.

Lift arm 19 activates a microswitch (not shown) at the top of its stroke, thus activating an air-controlled stop on the slide of the lift arm. The stop defines a position intermediate the lowest position of the stroke of arm 19 and the top of its stroke (as represented in FIGS. 25a to 25g).

With leader tape 143 disposed in the groove 4 of splicing block 3, the slack arm 145 conditions the cassette (ie the arm 145 is operated to take up leader tape 143 on one of the cassette spools).

When the lift arm 19 has been energized and reaches the top of its stroke, a delay is started after which vacuum is applied to vacuum shoes 5 and 6 in the groove 4 of block 3 and vacuum shoe 22 of lift arm 19 is switched on. This stage in the operating sequence is, of course, also represented by FIG. 25b.

Figure 25A:
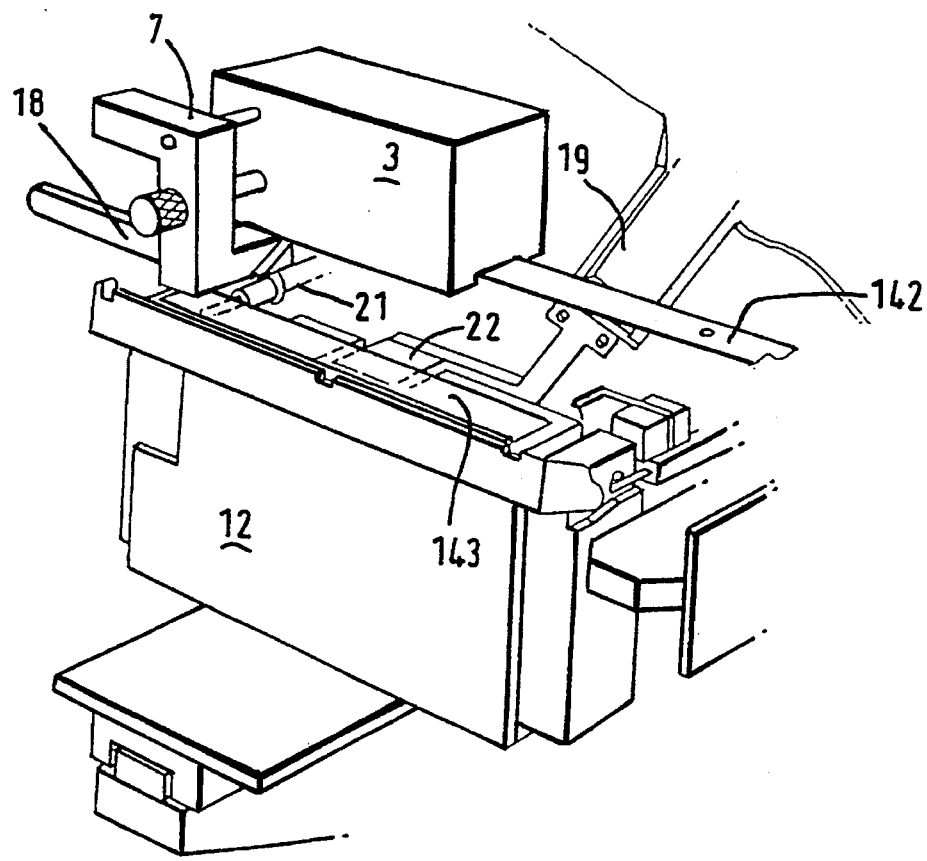
FIGS. 25a to 25i show the splicing station of a counterpart single-pancake winder, included for comparative purposes only.
Figure 25B:
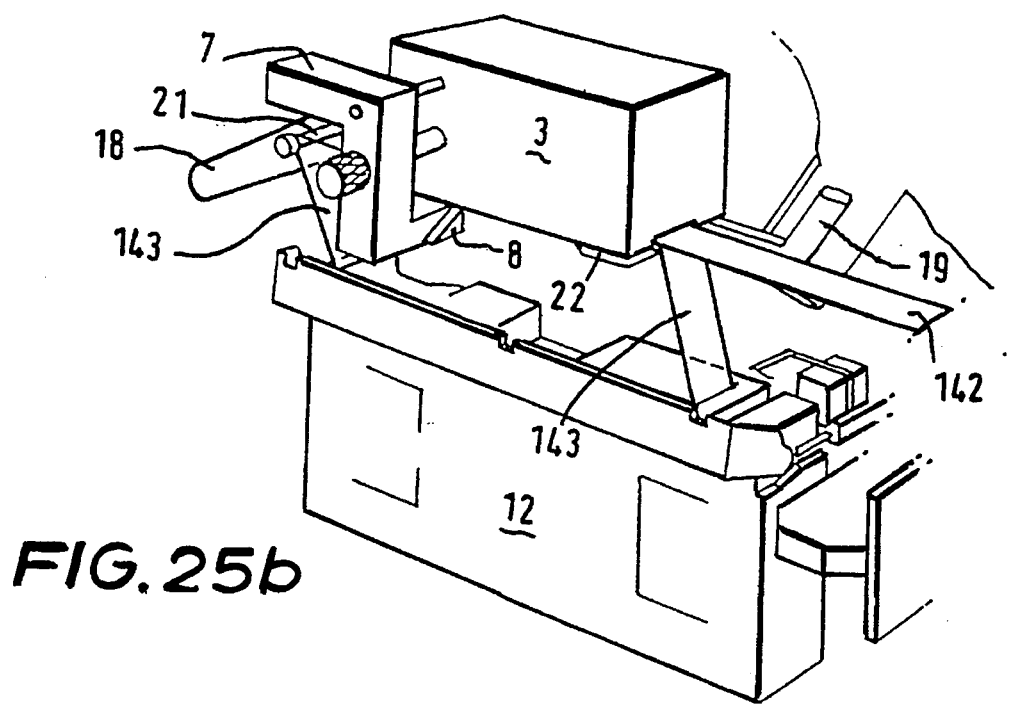
Figure 25C:
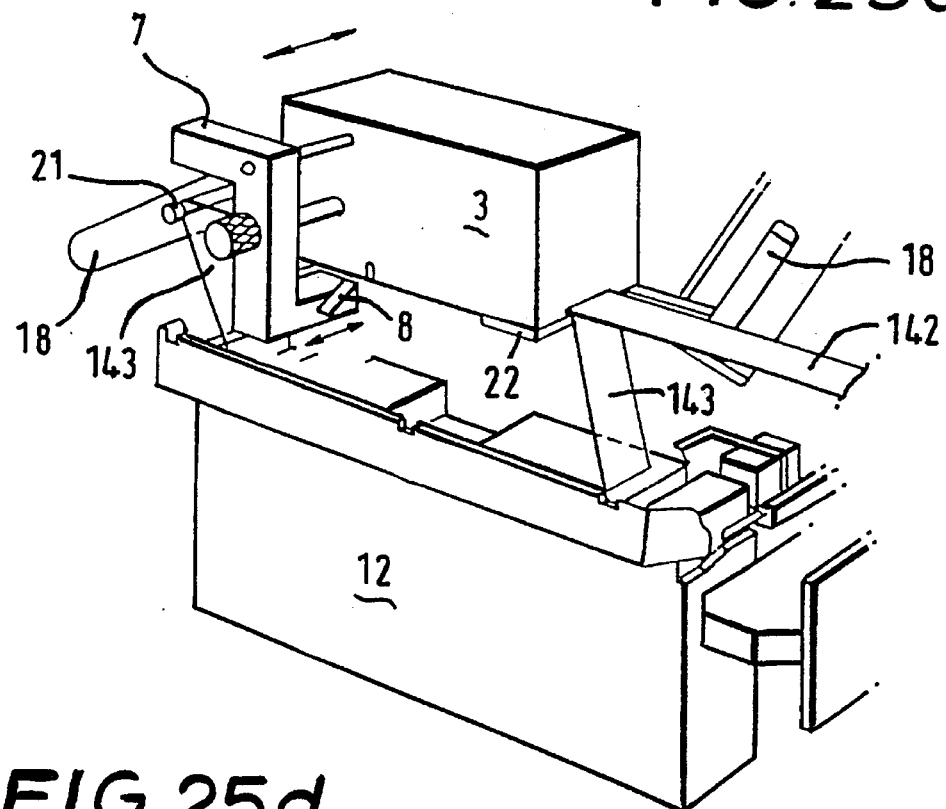
Figure 25D:
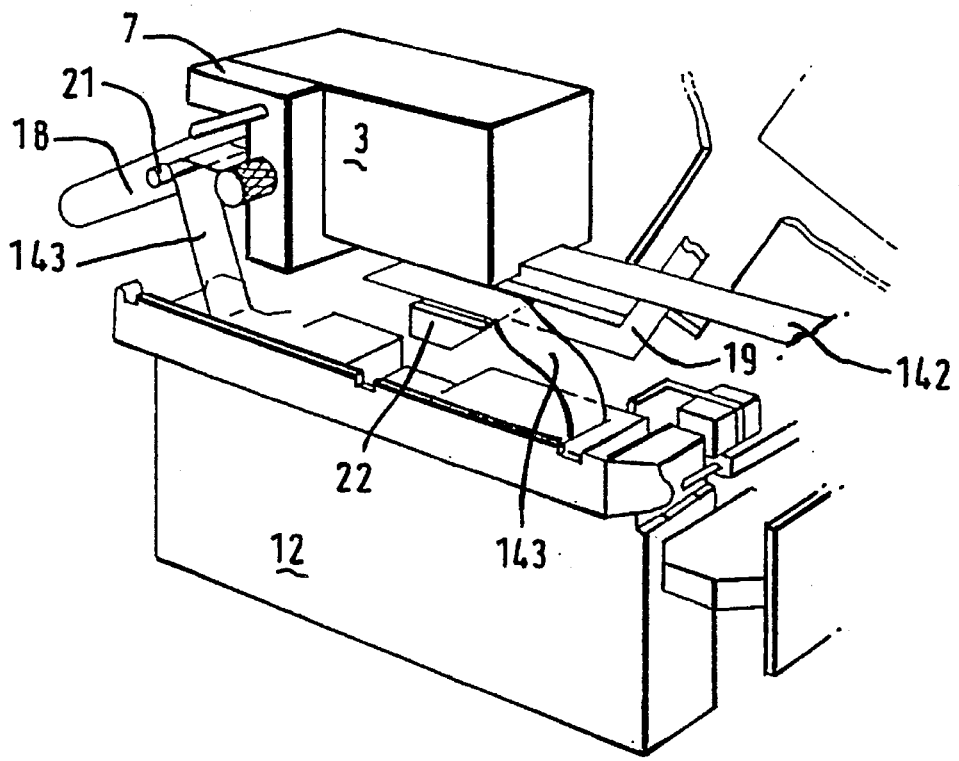

After an additional delay, slitting head 7 is activated causing the slitting blade 8 to move from its rest position, in which it is clear of block 3, towards face plate 108 and then to reciprocate to its rest position (FIG. 25c).

This slits leader tape 143 at the location of the leading end of magnetic tape 142 into a first or forward length which can be wound by hub 15 and a second length secured to the other spool of V-zero cassette.

The lift arm 19 and leader extraction arm 18 A are then de-energized causing them to drop under pneumatic force to their stops previously referred to. Vacuum shoe 22 is left switched on (FIG. 25d) to retain the second length of leader tape 143, the first length of leader tape 143 being retained on the groove surface by vacuum shoe 6 and the use tape 142 being retained, with its leading end butted to the trailing end of the first length of leader tape 143, in groove 4 by vacuum shoe 5.

Figure 25E:
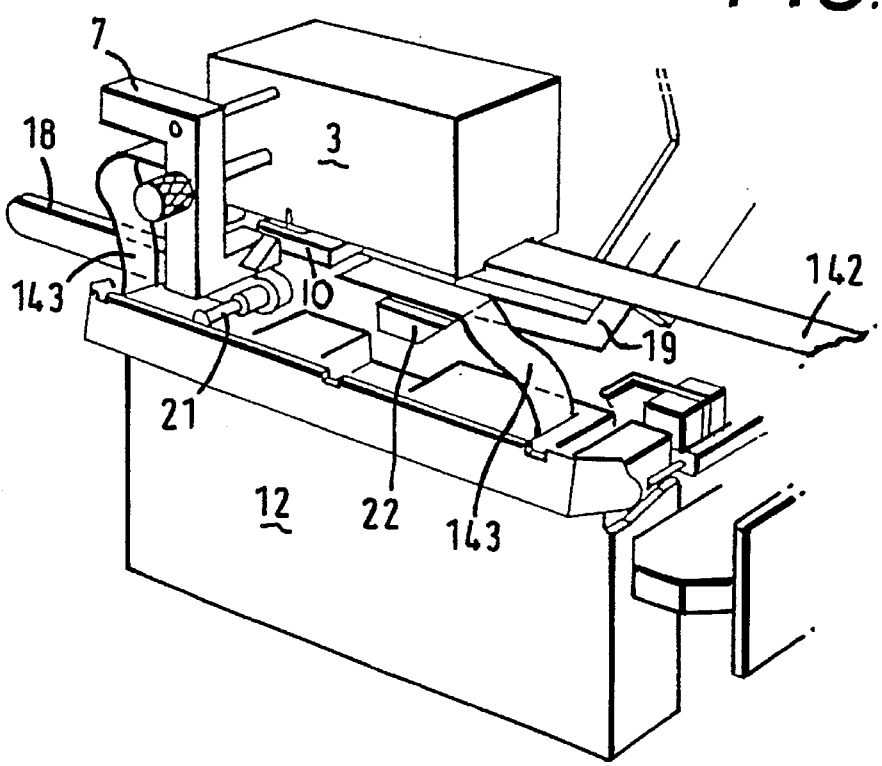

With the butting ends of the magnetic tape 142 and first or forward length of leader tape 143 retained in the above manner in groove 4, the splicing arm 10 is activated to adhere a short length of splicing tape over the butting end and thereby splice the two lengths together (FIG. 25e).

Figure 25F:
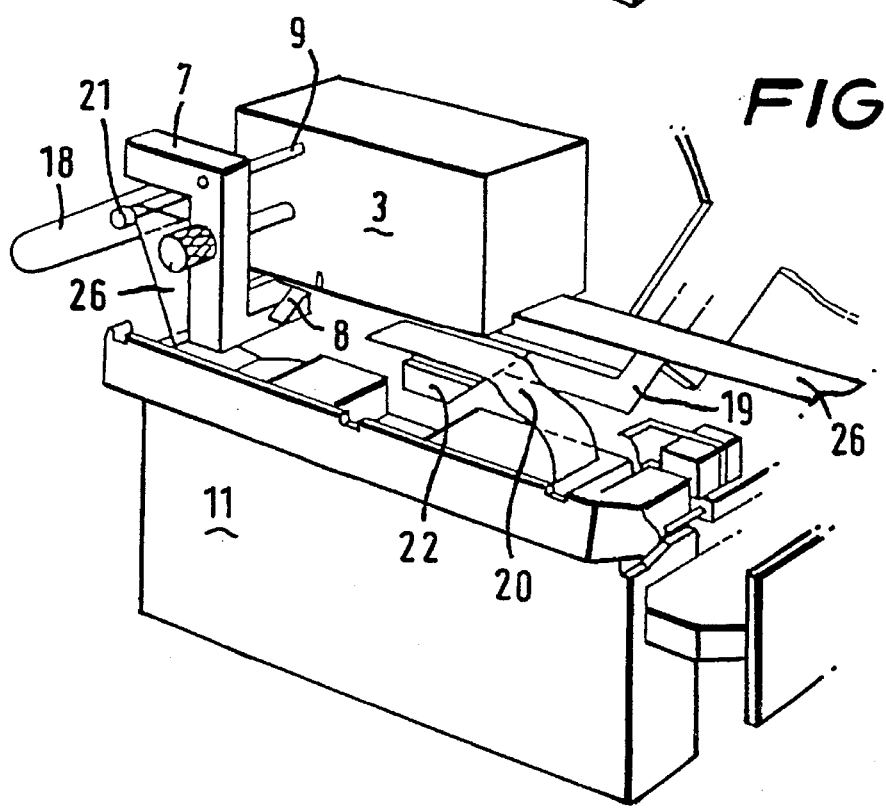

Leader extraction arm 18 is then again raised into leader tape contact and, with splicing arm 10 retracted, a wind cycle is commenced, vacuum continuing to be applied to vacuum shoe 22 but vacuum shoes 5 and 6 being deprived of vacuum so as to release the now spliced tape, by activating the wind motors driving hub 15 (FIG. 25f). When a predetermined length of magnetic tape 142 has been spooled into the cassette, the wind cycle stops and vacuum shoes 5 and 6 re-activated (FIG. 25f).

Figure 25G:
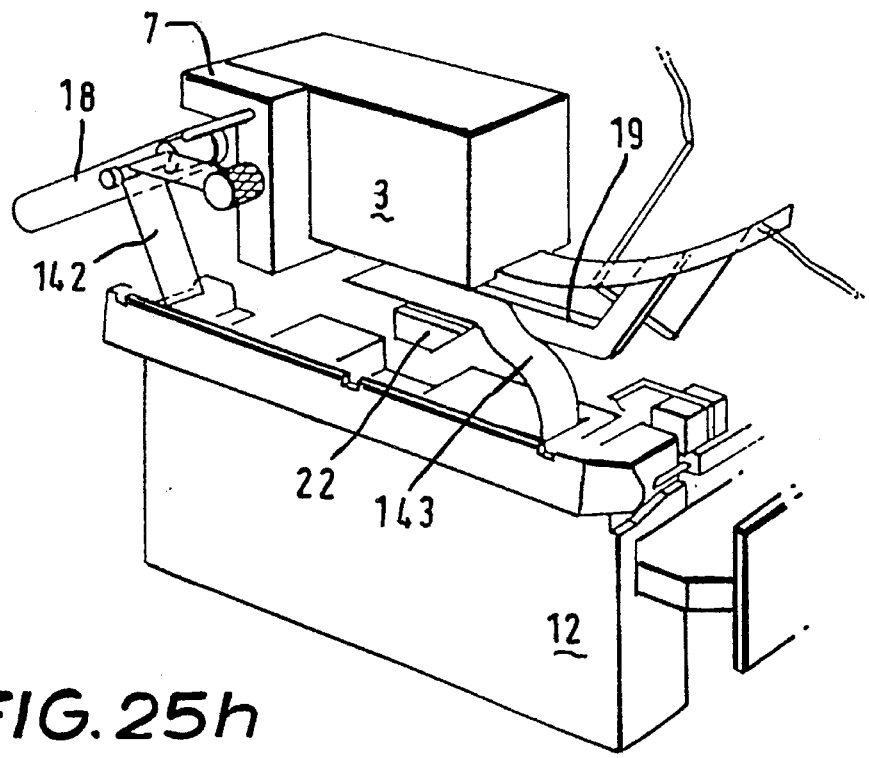
Figure 25H:
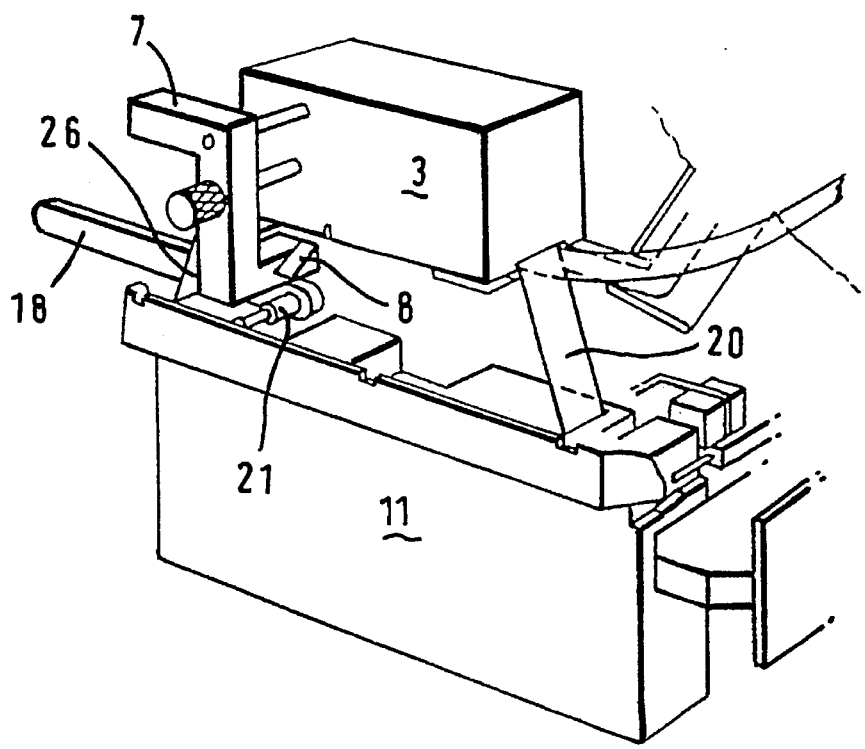

With a continuous length of magnetic tape 142 now retained in groove 4 by the vacuum shoes 5 and 6, a second slitting sequence is commenced to slit the use tape into two lengths (FIG. 25g). Lift arm 19 is then activated to raise the leading end of the leader tape 143 (ie the second leader tape length referred to earlier) into close proximity (ie about 0.25 mm away from the ceiling of groove 4) to the length of cut magnetic tape terminating in the leading end from the supply reel; leader extraction arm 18 is also de-energized (FIG. 25h). In this condition, the leader tape positioned as described has its end essentially butted to the end of the magnetic tape 142 trailing from the hub 15 of the cassette.

Figure 25I:
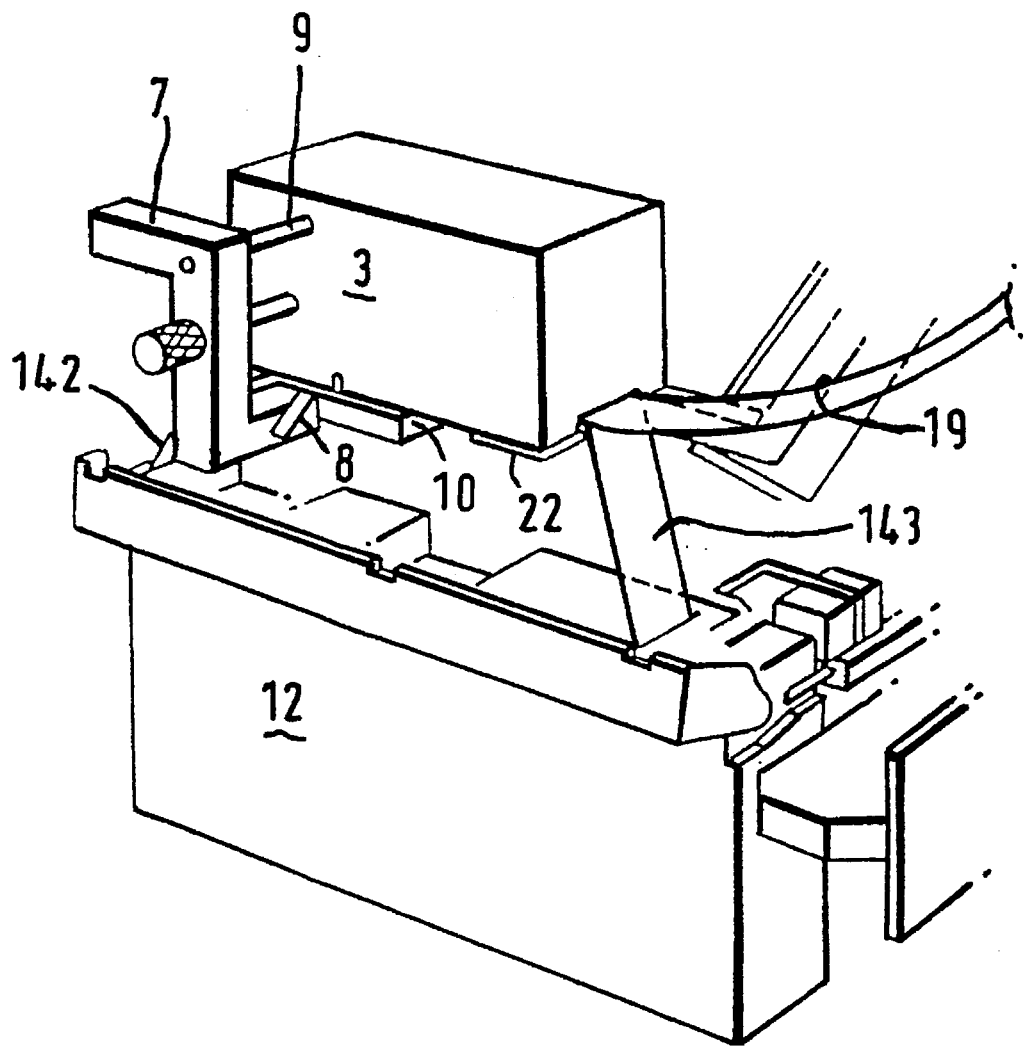

A second splicing operation is then effected by activating splicing arm 10 a second time to splice together the trailing end of magnetic tape 142 and the leading end of the leader tape 143 from the other spool of the cassette (FIG. 25*i*). Further winding at hub 15 after retraction of splicing arm 10, de-activation of vacuum shoe 5 and de-activation of lift arm 19 to the lowest position of its stroke draws the slack loop of tape into the cassette leaving only leader tape exposed at the mouth of the cassette. Continued activation of vacuum shoe 6 retains the leading end of magnetic tape 142 from the supply reel within groove 4 in readiness for a further cycle of operations to be conducted with a fresh V-zero cassette.

It will be appreciated that the invention claimed in the following claims and preferred features thereof can be summarized as the following enumerated embodiments:

1. A tape winding apparatus comprising a use tape supply station, a tape splicing station disposed so as in use to receive on a tape splicing surface thereof use tape wound from the use tape supply station in use, a cassette holding station disposed so as in use to receive on a hub of a cassette disposed at said cassette holding station tape wound from said tape splicing station, tape winding power means for driving said cassette hub to effect said winding of said tape, a plurality of tape guides defining with said splicing station a tape winding path from said tape supply station to said cassette hub, said plurality of tape guides including a final guide assembly for issuing tape to said cassette hub in winding of use tape from the use tape supply by the apparatus, said final guide assembly comprising leader extraction means comprising a leader extraction member and a final guide member, the leader extraction member having a rest position in which said member is disposed to penetrate beneath the non-extracted leader tape of the leader tape loop of a zero cassette charged to said cassette holding station and being mounted and arranged for two phases of reciprocatory displacement in the plane of said loop so that said leader extraction member can be removed from the locus of said cassette in a first phase of reciprocation to carry the leader tape loop externally from the cassette to said splicing surface of said splicing station and to the locus of said final guide member for release of said extracted tape loop and transfer thereof to said final guide member by said leader extraction member in a second phase of said reciprocatory displacement of said leader extraction member, said final guide member being displaceable laterally relative to the tape reciprocally between a position in and a position outside the plane of said loop at a final tape guiding location of the tape winding path at which said final guide member is otherwise fixed for rotation immediately upstream of and adjacent to the cassette input mouth, and said final guide member comprising a circularly cylindrical tape guide contact element which is mounted for rotation responsive to contact of its cylindrical surface in use by mobile tape winding to said driven cassette hub and guided by said tape guide contact element and which has a diameter sized too large to be accommodated beneath the aforesaid non-extracted leader tape of said cassette, tape cutting means disposed at said splicing station and addressing a cutting location at which tape is disposed on the splicing surface in use and tape splicing means for splicing tape ends together upon said splicing surface.

2. An apparatus as defined in Embodiment 1 wherein said tape supply station comprises means for mounting a plurality of separate stores of tape.

3. An apparatus as defined in Embodiment 2 wherein means is provided to mount a pair of separate magnetic tape stores for sequential use and changeover means is provided to introduce to the tape winding path a tape supply from a second magnetic tape store once the tape supply from a first is exhausted or depleted to a predetermined extent.

4. An apparatus as defined in Embodiment 3 wherein said tape supply station is configured to provide a pair of use tape stores in use and comprising a pair of tape tension control means, one tape tension control means being provided respectively for each tape store of said pair of tape stores and disposed to receive tape therefrom in use of the apparatus and said changeover means is changeover means disposed downstream of said tape tension control means for addressing the output tape of said tape tension control means of said use tape stores successively at a tape pick-up station downstream of said tape tension control means and outside said tape winding path, said changeover means being operable to introduce successively to said tape winding path use tape from each of said use tape stores by disposition thereof upon said splicing surface by a transfer member of said changeover means displaceable between said tape pick-up station and said splicing station, said changeover means being operable so as in use to address at said pick-up station one such use tape store and pick-up use tape therefrom, preparative to introducing said use tape to said winding path, during the time the use tape of the other use tape store issues to the tape winding path to supply the splicing station and the cassette hub.

5. An apparatus as defined in Embodiment 3 or Embodiment 4 wherein said changeover means comprises a displaceable elongate member provided with a tape securing head.

6. An apparatus as defined in any one of Embodiments 3 to 5 wherein said changeover means includes a tape securing head which comprises a mechanical clasp or a vacuum shoe.

7. An apparatus as defined in Embodiment 6 wherein said mechanical clasp comprises a tape carriage surface yieldingly supported by a compressible support means which yields resiliently under pressure from a tape length manually urged upon said tape carriage surface and jaw means overlying and normally in contact with said tape carriage surface and spaced therefrom when the tape carriage surface has yielded to form a mouth defined between said jaw means and said tape carriage surface, the jaw means comprising at least one member having a first mouth-defining face confronting the tape carriage surface but leaving part thereof exposed so as to provide an access to said tape carriage surface for said tape, said access accommodating the tape width only after its concurvature on a longitudinal tape axis, and a second face directed away from the tape carriage surface and configured to deform said tape to provide said concurvature with said manual urging of the tape length on said tape carriage surface.

8. An apparatus as defined in Embodiment 6 or Embodiment 7 wherein said displaceable elongate member is a cranked arm mounted for rotation through an arc between a first position in which said tape securing head and said arm are outside the tape winding path for manual provision to said head of a leading end of use tape emanating from a first of use tape stores and a second position in which said head is adjacent said splicing station and use tape carried by said head is disposed on said splicing surface for release thereto by said head.

9. An apparatus as defined in any one of Embodiments 3 to 8 wherein said changeover means comprises a member displaceable by rotation between a tape pick-up location outside the tape winding path and a tape-release position in which said member addresses the tape splicing surface, the member being displaceable perpendicularly with respect to the plane of the aforesaid displacement between a lockable position in which the member can be locked in said tape pick-up position and the aforesaid rotational displacement is prevented and a position in which the member is free to suffer said displacement by rotation to said tape-release position.

10. An apparatus as defined in any preceding embodiment wherein said extraction means is disposed for rotation displacement whereby the leader tape loop is carried to the splicing surface in said first phase of reciprocation and transferred to said final guide member in said second phase of reciprocation.

11. An apparatus as defined in Embodiment 10 wherein said extraction member is disposed for said rotational displacement about said final guide member.

12. An apparatus as defined in Embodiment 11 wherein said leader extraction means is disposed for said rotational displacement about the axis of rotation of said final guide member.

13. An apparatus as defined in any one of Embodiments 10 to 12 wherein said leader extraction means comprises an eccentric mounted for said rotational displacement and provided with a tape extraction element forming said leader extraction member and originating therefrom proximate the extremity thereof radially most remote from the axis of rotation of said eccentric and serving as said leader extraction member.

14. An apparatus as defined in any one of Embodiments 10 to 13 wherein the leader extraction means is rotationally displaceable between stops which define the radial positions of the leader extraction member at which first the non-extracted leader tape is almost in contact by its underside with the leader extraction member and at which secondly the extracted leader tape loop carried by said leader extraction member defines a loop plane which is interfacially juxtaposed to the final-guide member such that the extrapolated axis of rotation of said final guide member and an imaginary cylinder having the same axis and the diameter of said final guide member intersects with said loop plane.

15. An apparatus as defined in any one of Embodiments 10 to 14 wherein the leader extraction means is disposed to be driven in use in its rotational displacement by a stepper motor.

16. An apparatus as defined in any preceding Embodiment wherein said final guide member is reciprocatively displaceable linearly upon the axis of its rotation.

17. An apparatus as defined in any preceding embodiment and including a tachometric tape transport speed monitor including a tacho wheel and interfaced for the speed control purposes of the apparatus with said power means, and the plurality of tape guides defining with said splicing station and said tacho wheel said tape winding path from said tape supply station to said cassette hub, said tacho wheel being disposed in the tape winding path downstream of said splicing station.

18. An apparatus as defined in any preceding embodiment wherein said final guide member forms a tacho wheel of a tachometric tape transport speed monitor interfaced for the speed control purposes of the apparatus with said power means.

19. An apparatus as defined in any preceding Embodiment wherein the splicing surface is constructed as a vacuum shoe for tape retention purposes.

20. An apparatus as defined in any preceding Embodiment wherein the splicing surface is the floor of a groove depressed into the surface of a fixed splicing block and extending in the direction of the tape winding path.

21. An apparatus as defined in any preceding Embodiment wherein the splicing surface is defined upon a splicing block formed with a cutter groove traversing the part of the tape winding path coincident with the splicing surface.

22. An apparatus as defined in any preceding Embodiment wherein a leader tape retaining member is provided to retain the portion of said leader tape issuing from said cassette and disposed upstream of said cutting location on said splicing surface.

23. An apparatus as defined in Embodiment 22 wherein said leader tape retaining member is displaceable between a first position in which it is in use disposed beneath the non-extracted leader tape loop of the leader tape of the zero cassette and a second position in which it has been removed from the locus of the cassette to assist in carrying the leader tape loop externally of the cassette to said splicing surface of said splicing station.

24. An apparatus as defined in Embodiment 22 or Embodiment 23 wherein said leader tape retaining member is disposed for displacement from the locus of the splicing surface to carry its charge of upstream leader tape from said tape path after operation of said tape cutting means to sever the leader tape into separate upstream and downstream leader tape portions and for reciprocal displacement to restore said upstream leader tape portion to said tape path at said splicing surface at termination of use tape winding into said cassette, preparative to splicing of the leading end of said upstream leader tape portion to the use tape trailing end disposed upon said splicing surface after operation of said tape cutting means in relation to use tape stationary on the splicing surface at said winding termination.

25. An apparatus as defined in any one of Embodiments 22 to 24 wherein said leader tape retaining member has a surface constructed as a vacuum shoe.

26. An apparatus as defined in any one of Embodiments 22 to 24 wherein said leader tape retaining member is a cranked elongate member.

27. An apparatus as defined in any one of Embodiments 22 to 26 wherein said leader tape retaining means is coupled to power means for driving said retaining means in linear reciprocatory displacement.

28. A method of loading tape into cassettes which method comprises disposing a leading end of use tape emanating from a use tape supply at a use tape supply station of a tape winding apparatus upon a splicing surface of the apparatus, whilst retaining the use tape on said splicing surface optionally cutting the tape across its lateral dimension to form separate upstream and downstream portions of use tape, charging a zero cassette to said apparatus subsequent to said cutting or at a previous juncture, extracting a loop of leader tape from said cassette and disposing said leader tape of said loop on the splicing surface, whilst retaining the leader tape on the splicing surface either cutting the leader tape across its lateral dimension in overlying relationship with the upstream portion of use tape and with the leader tape cut corresponding to the position of the cut end of the upstream portion of use tape whereby separate upstream and downstream portions of said leader tape are formed, or cutting the use tape and overlying leader tape together whereby both are cut into separate upstream and downstream portions, disposing the upstream leader tape portion on a leader tape retainer and removing said upstream leader tape portion from the splicing surface by displacement of said leader tape retainer, splicing the so exposed upstream portion of use tape on the splicing surface to the downstream portion of leader tape on the splicing surface, and winding use tape into the cassette, the downstream portion of said use tape being removed from the splicing surface, and at a post-winding juncture restoring the use tape to the splicing surface, cutting the use tape thereon, the upstream leader tape portion being brought into end-to-end abutment on the splicing surface with the trailing end of the so-cut use tape, splicing together the abutting ends and discharging the loaded cassette preparative to loading a further cassette, characterized in that the loop of leader tape is extracted from the cassette by disposing beneath the non-extracted leader tape loop of said cassette a leader extraction member of leader extraction means forming part of a final guide assembly comprising said leader extraction means and a final guide member of a plurality of tape guide members defining with said splicing surface a tape winding path from said use tape supply to said cassette, removing the leader extraction member from the locus of the cassette by displacement of said leader extraction member in the plane of said loop to carry said loop externally from the cassette to said splicing surface and to the locus of said final guide member, displacing said final guide member laterally relative to the tape through its width from a position outside the plane of said loop to a position in said plane at a final guiding location of the tape winding path at which said final guide is otherwise fixed for rotation immediately upstream of and adjacent to the cassette input mouth and at a post-splicing juncture releasing the tape loop from said leader extraction means to said final guide and from retention on said splicing surface preparative to said winding, and characterized in that at a post-winding juncture the leader extraction member collects the use tape from the final guide and disposes it upon the splicing surface and the final guide displaces reciprocally with respect to its aforesaid displacement.

29. A tape winding apparatus which comprises a use tape supply station configured for the provision of a pair of use tape stores in use and comprising a pair of tape tension control means, one tape tension control means being provided respectively for each tape store of said pair of tape stores and disposed to receive tape therefrom in use of the apparatus, a tape splicing station disposed downstream of the tape supply station and so as in use to receive on a tape splicing surface thereof use tape wound from a tape tension control means and use tape store disposed at said tape supply station, a cassette holding station disposed downstream of said tape splicing station and so as in use to receive on a hub of a cassette disposed at said cassette holding station, tape wound from said tape splicing station in use, tape winding power means for driving said cassette hub to effect tape winding, a plurality of tape guides for defining with said splicing station a tape winding path extending from said use tape supply station to said cassette hub, the apparatus including leader extraction means having an extraction member displaceable between a first position in which in use it is disposed in juxtaposed relation to the non-extracted leader tape loop of the leader tape of a zero cassette charged in use to said cassette holding station and a second position in which it has been removed from the locus of the cassette to carry the leader tape loop externally of the cassette to said splicing surface of said splicing station, changeover means disposed downstream of said tape tension control means for addressing the output tape of said tape tension control means of said use tape stores successively at a tape pick-up station downstream of said tape tension control means and outside said tape winding path, said changeover means -being operable to introduce successively to said tape winding path use tape from each of said use tape stores by disposition thereof upon said splicing surface by a transfer member of said changeover means displaceable between said tape pick-up station and said splicing station, said changeover means being operable so as in use to address at said pick-up station one such use tape store and pick-up use tape therefrom, preparative to introducing said use tape to said winding path, during the time the use tape of the other use tape store issues to the tape winding path to supply the splicing station and the cassette hub, tape cutting means disposed at said splicing station and addressing a cutting location at which tape is disposed on the splicing surface in use and tape splicing means for splicing tape ends together upon said splicing surface.

30. An apparatus as defined in Embodiment 29 and including a tachometric tape transport speed monitor which includes a tacho wheel and is interfaced for the speed control purposes of the apparatus with said power means, said plurality of tape guides defining with said splicing station and said tacho wheel a tape winding path from said tape supply station to said cassette hub and said tacho wheel being disposed in the tape winding path downstream of said splicing station.

31. An apparatus as defined in Embodiment 29 or Embodiment 30 and comprising a use tape supply station, a tape splicing station disposed so as in use to receive on a tape splicing surface thereof use tape wound from the use tape supply station in use, a cassette holding station disposed so as in use to receive on a hub of a cassette disposed at said cassette holding station, tape wound from said tape splicing station, tape winding power means for driving said cassette hub to effect said winding of said tape, and a plurality of tape guides defining with said splicing station a tape winding path from said use tape supply station to said cassette hub, said plurality of tape guides including a final guide assembly for issuing tape to said cassette hub in winding of use tape from the use tape supply by the apparatus, said final guide assembly comprising leader extraction means comprising a leader extraction member and a final guide member, the leader extraction member having a rest position in which said member is disposed to penetrate beneath the non-extracted leader tape of the leader tape loop of a zero cassette charged to said cassette holding station and being mounted and arranged for two phases of reciprocatory displacement in the plane of said loop so that said leader extraction member can be removed from the locus of said cassette in a first phase of reciprocation to carry the leader tape loop externally from the cassette to said splicing surface of said splicing station and to the locus of said final guide member for release of said extracted tape loop and transfer thereof to said final guide member by said leader extraction member in a second phase of said reciprocatory displacement of said leader extraction member, said final guide member being displaceable laterally relative to the tape reciprocally between a position in and a position outside the plane of said loop at a final tape guiding location of the tape winding path at which said final guide member is otherwise fixed for rotation immediately upstream of and adjacent to the cassette input mouth, and said final guide member comprising a circularly cylindrical tape guide contact element which is mounted for rotation responsive to contact of its cylindrical surface in use by mobile tape winding to said driven cassette hub and guided by said tape guide contact element and which has a diameter sized too large to be accommodated beneath the aforesaid non-extracted leader tape of said cassette.

32. An apparatus as defined in Embodiment 31 wherein said extraction means is disposed for rotation displacement whereby the leader tape loop is carried to the splicing surface in said first phase of reciprocation and transferred to said final guide member in said second phase of reciprocation.

33. An apparatus as defined in Embodiment 32 wherein said extraction member is disposed for said rotational displacement about said final guide member.

34. An apparatus as defined in Embodiment 33 wherein said leader extraction means is disposed for said rotational displacement about the axis of rotation of said final guide member.

35. An apparatus as defined in any one of Embodiments 32 to 34 wherein said leader extraction means comprises an eccentric mounted for said rotational displacement and provided with a tape extraction element forming said leader extraction member and originating therefrom proximate the extremity thereof radially most remote from the axis of rotation of said eccentric and serving as said leader extraction member.

36. An apparatus as defined in any one of Embodiments 32 to 35 wherein the leader extraction means is rotationally displaceable between stops which define the radial positions of the leader extraction member at which first the non-extracted leader tape is almost in contact by its underside with the leader extraction member and at which secondly the extracted leader tape loop carried by said leader extraction member defines a loop plane which is interfacially juxtaposed to the final guide member such that the extrapolated axis of rotation of said final guide member and an imaginary cylinder having the same axis and the diameter of said final guide member intersects with said loop plane.

37. An apparatus as defined in any one of Embodiments 32 to 36 wherein the leader extraction means is disposed to be driven in use in its rotational displacement by a stepper motor.

38. An apparatus as defined in any one of Embodiments 31 to 37 wherein said final guide member is reciprocatively displaceable linearly upon the axis of its rotation.

39. An apparatus as defined in any one of Embodiments 31 to 38 wherein said final guide member forms a tacho wheel of a tachometric tape transport speed monitor interfaced for the speed control purposes of the apparatus with said power means.

40. An apparatus as defined in any one of Embodiments 29 to 39 wherein the splicing surface is constructed as a vacuum shoe for tape retention purposes.

41. An apparatus as defined in any one of Embodiments 29 to 40 wherein the splicing surface is the floor of a groove depressed into the surface of a fixed splicing block and extending in the direction of the tape winding path.

42. An apparatus as defined in any one of Embodiments 29 to 41 wherein the splicing surface is defined upon a splicing block formed with a cutter groove traversing the part of the tape winding path coincident with the splicing surface.

43. An apparatus as defined in any one of Embodiments 29 to 42 wherein a leader tape retaining member is provided to retain the portion of said leader tape issuing from said cassette and disposed upstream of said cutting location on said splicing surface.

44. An apparatus as defined in Embodiment 43 wherein said leader tape retaining member is displaceable between a first position in which it is in use disposed beneath the non-extracted leader tape loop of the leader tape of the zero cassette and a second position in-which it has been removed from the locus of the cassette to assist in carrying the leader tape loop externally of the cassette to said splicing surface of said splicing station.

45. An apparatus as defined in Embodiment 43 or Embodiment 44 wherein said leader tape retaining member is disposed for displacement from the locus of the splicing surface to carry its charge of upstream leader tape from said tape path after operation of said tape cutting means to sever the leader tape into separate upstream and downstream leader tape portions and for reciprocal displacement to restore said upstream leader tape portion to said tape path at said splicing surface at termination of use tape winding into said cassette, preparative to splicing of the leading end of said upstream leader tape portion to the use tape trailing end disposed upon said splicing surface after operation of said tape cutting means in relation to use tape stationary on the splicing surface at said winding termination.

46. An apparatus as defined in any one of Embodiments 43 to 45 wherein said leader tape retaining member has a surface constructed as a vacuum shoe.

47. An apparatus as defined in any one of Embodiments 43 to 46 wherein said leader tape retaining member is a cranked elongate member.

48. An apparatus as defined in any one of Embodiments 43 to 47 wherein said leader tape retaining means is coupled to power means for driving said retaining means in linear reciprocatory displacement.

49. An apparatus as defined in any one of Embodiments 29 to 48 wherein said changeover means comprises a displaceable elongate member provided with a tape securing head.

50. An apparatus as defined in any one of Embodiments 29 to 49 wherein said changeover means includes a tape securing head which comprises a mechanical clasp or a vacuum shoe.

51. An apparatus as defined in Embodiment 50 wherein said mechanical clasp comprises a tape carriage surface yieldingly supported by a compressible support means which yields resiliently under pressure from a tape length manually urged upon said tape carriage surface and jaw means overlying and normally in contact with said tape carriage surface and spaced therefrom when the tape carriage surface has yielded to form a mouth defined between said jaw means and said tape carriage surface, the jaw means comprising at least one member having a first mouth-defining face confronting the tape carriage surface but leaving part thereof exposed so as to provide an access to said tape carriage surface for said tape, said access accommodating the tape width only after its concurvature on a longitudinal tape axis, and a second face directed away from the tape carriage surface and configured to deform said tape to provide said concurvature with said manual urging of the tape length on said tape carriage surface.

52. An apparatus as defined in Embodiment 50 or Embodiment 51 wherein said displaceable elongate member is a cranked arm mounted for rotation through an arc between a first position in which said tape securing head and said arm are outside the tape winding path for manual provision to said head of a leading end of use tape emanating from a first of use tape stores and a second position in which said head is adjacent said splicing station and use tape carried by said head is disposed on said splicing surface for release thereto by said head.

53. An apparatus as defined in any one of Embodiments 29 to 52 wherein said changeover means comprises a member displaceable by rotation between a tape pick-up location outside the tape winding path and a tape-release position in which said member addresses the tape splicing surface, the member being displaceable perpendicularly with respect to the plane of the aforesaid displacement between a lockable position in which the member can be locked in said tape pick-up position and the aforesaid rotational displacement is prevented and a position in which the member is free to suffer said displacement by rotation to said tape-release position.

54. A method of loading tape into cassettes which method comprises securing a leading end of use tape from a first use tape store to changeover means of a tape winding apparatus, the securing of said tape being effected at a tape pick-up station of the apparatus downstream of said first use tape store, performing tape loading by operating the changeover means to carry the use tape to a splicing surface of the apparatus, whilst retaining the use tape on said splicing surface optionally cutting the tape across its lateral dimension to form separate upstream and downstream portions of use tape, charging a zero cassette to said apparatus subsequent to said cutting or at a previous juncture, extracting a loop of leader tape from said cassette and disposing said leader tape of said loop on the splicing surface, the changeover means being operated to restore said changeover means to the tape pickup station, whilst retaining the leader tape on the splicing surface either cutting the leader tape across its lateral dimension in overlying relationship with the upstream portion of use tape and with the leader tape cut corresponding to the position of the cut end of the upstream portion of use tape whereby separate upstream and downstream portions of said leader tape are formed, or cutting the use tape and overlying leader tape together whereby both are cut into separate upstream and downstream portions, disposing the upstream leader tape portion on a leader tape retainer and removing said upstream leader tape portion from the splicing surface by displacement of said leader tape retainer, splicing the so exposed upstream portion of use tape on the splicing surface to the downstream portion of leader tape on the splicing surface, and winding use tape into the cassette, the downstream portion of said use tape being removed from the splicing surface, and at a post-winding juncture restoring the use tape to the splicing surface, cutting the use tape thereon, the upstream leader tape portion being brought into end-to-end abutment on the splicing surface with the trailing end of the so-cut use tape, splicing together the abutting ends and discharging the loaded cassette preparative to loading a further cassette, whilst winding of said cassette or a further cassette takes place a leading end of use tape from a second use tape store being secured to said changeover means at said tape pick-up station preparative to repeating the aforesaid tape loading using the second use tape store once the first use tape store is exhausted or has reached a predetermined reduction.

55. A mechanical clasp assembly for clasping magnetic tape or print tape in a tape handling operation, the assembly comprising an arm and a mechanical clasp carried by the arm and comprising a tape carriage surface yieldingly supported by a compressible support means which yields resiliently under pressure from a tape length manually urged upon said tape carriage surface and jaw means overlying and normally in contact with said tape carriage surface and spaced therefrom when the tape carriage surface has yielded to form a mouth defined between said jaw means and said tape carriage surface, the jaw means comprising at least one member having a first mouth-defining face confronting the tape carriage surface but leaving part thereof exposed so as to provide an access to said tape carriage surface for said tape, said access accommodating the tape width only after its concurvature on a longitudinal tape axis, and a second face directed away from the tape carriage surface and configured to deform said tape to provide said concurvature with said manual urging of the tape length on said tape carriage surface.

56. A tape winding apparatus comprising a use tape supply station, a tape splicing station disposed so as in use to receive on a tape splicing surface thereof use tape wound from the use tape supply station in use, a cassette holding station disposed so as in use to receive on a hub of a cassette disposed at said cassette holding station tape wound from said tape splicing station, tape winding power means for driving said cassette hub to effect said winding of said tape, a tachometric tape transport speed monitor including a tacho wheel and interfaced for the speed control purposes of the apparatus with said power means, a plurality of tape guides defining with said splicing station and said tacho wheel a tape winding path from said tape supply station to said cassette hub, the apparatus including leader extraction means having a leader extraction member displaceable between a first position in which it is disposed beneath the non-extracted leader tape of the leader tape loop of a zero cassette charged to said cassette holding station and a second position in which it has been removed from the locus of the cassette to carry a leader tape loop externally of the cassette to said splicing surface of said splicing station, said tacho wheel being disposed in the tape winding path downstream of said splicing station, tape cutting means disposed at said splicing station and addressing a cutting location at which tape is disposed on the splicing surface in use and tape splicing means for splicing tape ends together upon said splicing surface.

57. An apparatus as defined in Embodiment 56 wherein said tape supply station comprises means for mounting a plurality of separate stores of tape.

58. An apparatus as defined in Embodiment 57 wherein means is provided to mount a pair of separate magnetic tape stores for sequential use and changeover means is provided to introduce to the tape winding path a tape supply from a second magnetic tape store once the tape supply from a first is exhausted or depleted to a predetermined extent.

59. An apparatus as defined in Embodiment 58 wherein said tape supply station is configured to provide a pair of use tape stores in use and comprising a pair of tape tension control means, one tape tension control means being provided respectively for each tape store of said pair of tape stores and disposed to receive tape therefrom in use of the apparatus and said changeover means is changeover means disposed downstream of said tape tension control means for addressing the output tape of said tape tension control means of said use tape stores successively at a tape pick-up station downstream of said tape tension control means and outside said tape winding path, said changeover means being operable to introduce successively to said tape winding path use tape from each of said use tape stores by disposition thereof upon said splicing surface by a transfer member of said changeover means displaceable between said tape pick-up station and said splicing station, said changeover means being operable so as in use to address at said pick-up station one such use tape store and pick-up use tape therefrom, preparative to introducing said use tape to said winding path, during the time the use tape of the other use tape store issues to the tape winding path to supply the splicing station and the cassette hub.

60. An apparatus as defined in Embodiment 58 or Embodiment 59 wherein said changeover means comprises a displaceable elongate member provided with a tape securing head.

61. An apparatus as defined in any one of Embodiments 58 to 59 wherein said changeover means includes a tape securing head which comprises a mechanical clasp or a vacuum shoe.

62. An apparatus as defined in Embodiment 61 wherein said mechanical clasp comprises a tape carriage surface yieldingly supported by a compressible support means which yields resiliently under pressure from a tape length manually urged upon said tape carriage surface and jaw means overlying and normally in contact with said tape carriage surface and spaced therefrom when the tape carriage surface has yielded to form a mouth defined between said jaw means and said tape carriage surface, the jaw means comprising at least one member having a first mouth-defining face confronting the tape carriage surface but leaving part thereof exposed so as to provide an access to said tape carriage surface for said tape, said access accommodating the tape width only after its concurvature on a longitudinal tape axis, and a second face directed away from the tape carriage surface and configured to deform said tape to provide said concurvature with said manual urging of the tape length on said tape carriage surface.

63. An apparatus as defined in Embodiment 61 or Embodiment 62 wherein said displaceable elongate member is a cranked arm mounted for rotation through an arc between a first position in which said tape securing head and said arm are outside the tape winding path for manual provision to said head of a leading end of use tape emanating from a first of use tape stores and a second position in which said head is adjacent said splicing station and use tape carried by said head is disposed on said splicing surface for release thereto by said head.

64. An apparatus as defined in any one of Embodiments 58 to 63 wherein said changeover means comprises a member displaceable by rotation between a tape pick-up location outside the tape winding path and a tape-release position in which said member addresses the tape splicing surface, the member being displaceable perpendicularly with respect to the plane of the aforesaid displacement between a lockable position in which the member can be locked in said tape pick-up position and the aforesaid rotational displacement is prevented and a position in which the member is free to suffer said displacement by rotation to said tape-release position.

65. An apparatus as defined in any one of Embodiments 56 to 64 wherein said extraction means is disposed for rotation displacement whereby the leader tape loop is carried to the splicing surface in said first phase of reciprocation and transferred to said final guide member in said second phase of reciprocation.

66. An apparatus as defined in Embodiment 65 wherein said extraction member is disposed for said rotational displacement about said final guide member.

67. An apparatus as defined in Embodiment 66 wherein said leader extraction means is disposed for said rotational displacement about the axis of rotation of said final guide member.

68. An apparatus as defined in any one of Embodiments 65 to 67 wherein said leader extraction means comprises an eccentric mounted for said rotational displacement and provided with a tape extraction element forming said leader extraction member and originating therefrom proximate the extremity thereof radially most remote from the axis of rotation of said eccentric and serving as said leader extraction member.

69. An apparatus as defined in any one of Embodiments 65 to 68 wherein the leader extraction means is rotationally displaceable between stops which define the radial positions of the leader extraction member at which first the non-extracted leader tape is almost in contact by its underside with the leader extraction member and at which secondly the extracted leader tape loop carried by said leader extraction member defines a loop plane which is interfacially juxtaposed to the final guide member such that the extrapolated axis of rotation of said final guide member and an imaginary cylinder having the same axis and the diameter of said final guide member intersects with said loop plane.

70. An apparatus as defined in any one of Embodiments 65 to 69 wherein the leader extraction means is disposed to be driven in use in its rotational displacement by a stepper motor.

71. An apparatus as defined in any one of Embodiments 56 to 70 wherein said final guide member is reciprocatively displaceable linearly upon the axis of its rotation.

72. An apparatus as defined in any one of Embodiments 56 to 71 and comprising a use tape supply station, a tape splicing station disposed so as in use to receive on a tape splicing surface thereof use tape wound from the use tape supply station in use, a cassette holding station disposed so as in use to receive on a hub of a cassette disposed at said cassette holding station, tape wound from said tape splicing station, tape winding power means for driving said cassette hub to effect said winding of said tape, and a plurality of tape guides defining with said splicing station a tape winding path from said use tape supply station to said cassette hub, said plurality of tape guides including a final guide assembly for issuing tape to said cassette hub in winding of use tape from the use tape supply by the apparatus, said final guide assembly comprising leader extraction means comprising a leader extraction member and a final guide member, the leader extraction member having a rest position in which said member is disposed to penetrate beneath the non-extracted leader tape of the leader tape loop of a zero cassette charged to said cassette holding station and being mounted and arranged for two phases of reciprocatory displacement in the plane of said loop so that said leader extraction member can be removed from the locus of said cassette in a first phase of reciprocation to carry the leader tape loop externally from the cassette to said splicing surface of said splicing station and to the locus of said final guide member for release of said extracted tape loop and transfer thereof to said final guide member by said leader extraction member in a second phase of said reciprocatory displacement of said leader extraction member, said final guide member being displaceable laterally relative to the tape reciprocally between a position in and a position outside the plane of said loop at a final tape guiding location of the tape winding path at which said final guide member is otherwise fixed for rotation immediately upstream of and adjacent to the cassette input mouth, and said final guide member comprising a circularly cylindrical tape guide contact element which is mounted for rotation responsive to contact of its cylindrical surface in use by mobile tape winding to said driven cassette hub and guided by said tape guide contact element and which has a diameter sized too large to be accommodated beneath the aforesaid non-extracted leader tape of said cassette.

73. An apparatus as defined in Embodiment 72 wherein said final guide member forms the tacho wheel of the tachometric tape transport speed monitor.

74. An apparatus as defined in any one of Embodiments 56 to 73 wherein the splicing surface is constructed as a vacuum shoe for tape retention purposes.

75. An apparatus as defined in any one of Embodiments 56 to 74 wherein the splicing surface is the floor of a groove depressed into the surface of a fixed splicing block and extending in the direction of the tape winding path.

76. An apparatus as defined in any one of Embodiments 56 to 75 wherein the splicing surface is defined upon a splicing block formed with a cutter groove traversing the part of the tape winding path coincident with the splicing surface.

77. An apparatus as defined in any one of Embodiments 56 to 76 wherein a leader tape retaining member is provided to retain the portion of said leader tape issuing from said cassette and disposed upstream of said cutting location on said splicing surface.

78. An apparatus as defined in Embodiment 77 wherein said leader tape retaining member is displaceable between a first position in which it is in use disposed beneath the non-extracted leader tape loop of the leader tape of the zero cassette and a second position in which it has been removed from the locus of the cassette to assist in carrying the leader tape loop externally of the cassette to said splicing surface of said splicing station.

79. An apparatus as defined in Embodiment 77 or Embodiment 78 wherein said leader tape retaining member is disposed for displacement from the locus of the splicing surface to carry its charge of upstream leader tape from said tape path after operation of said tape cutting means to sever the leader tape into separate upstream and downstream leader tape portions and for reciprocal displacement to restore said upstream leader tape portion to said tape path at said splicing surface at termination of use tape winding into said cassette, preparative to splicing of the leading end of said upstream leader tape portion to the use tape trailing end disposed upon said splicing surface after operation of said tape cutting means in relation to use tape stationary on the splicing surface at said winding termination.

80. An apparatus as defined in any one of Embodiments 77 to 79 wherein said leader tape retaining member has a surface constructed as a vacuum shoe.

81. An apparatus as defined in any one of Embodiments 77 to 79 wherein said leader tape retaining member is a cranked elongate member.

82. An apparatus as defined in any one of Embodiments 77 to 79 wherein said leader tape retaining means is coupled to power means for driving said retaining means in linear reciprocatory displacement.

83. A method of winding use tape into cassettes which method comprises winding use tape from a supply to a splicing station, cutting the tape on a splicing surface at said splicing station, splicing the cut upstream use tape leading end to the trailing end of a cut downstream portion of leader tape emanating from the wind-in mouth of a cassette downstream of said splicing station, winding the leader tape and spliced use tape into the cassette, and post-winding cutting the use tape on said splicing surface and splicing the resulting trailing end to the leading end of an upstream portion of leader tape emanating from the other cassette mouth and previously forming an unbroken loop of leader tape between the cassette hubs with said leader tape downstream portion, characterized in that winding is effected by means of electrical motive power means controlled b speed control means interfaced with a tachometric tape speed monitoring device having a tacho wheel in the tape winding path addressing the motion of tape downstream of the splicing station and upstream of the cassette wind-in mouth.

I claim:

1. A tape winding apparatus comprising a use tape supply station, a tape splicing station disposed so as in use to receive on a tape splicing surface thereof use tape wound from the use tape supply station in use, a cassette holding station disposed so as in use to receive on a hub of a cassette disposed at said cassette holding station tape, which said cassette was wound from said tape splicing station, tape winding power means for driving said cassette hub to effect said winding of said tape, a plurality of tape guides defining with said splicing station a tape winding path from said tape supply station to said cassette hub, said plurality of tape guides including a final guide assembly for issuing tape to said cassette hub in winding of use tape from the use tape supply by the apparatus, said final guide assembly comprising leader extraction means comprising a leader extraction member and a final guide member, the leader extraction member having a rest position in which said member is disposed to penetrate beneath the non-extracted leader tape of the leader tape loop of a zero cassette charged to said cassette holding station and being mounted and arranged for two phases of reciprocatory displacement in the plane of said loop so that said leader extraction member can be removed from the locus of said cassette in a first phase of reciprocation to carry the leader tape loop externally from the cassette to said splicing surface of said splicing station and to the locus of said final guide member for release of said extracted tape loop and transfer thereof to said final guide member by said leader extraction member in a second phase of said reciprocatory displacement of said leader extraction member, said final guide member being displaceable laterally relative to the tape reciprocally between a position in and a position outside the plane of said loop at a final tape guiding location of the tape winding path at which said final guide member is otherwise fixed for rotation immediately upstream of and adjacent to the cassette input mouth, and said final guide member comprising a circularly cylindrical tape guide contact element which is mounted for rotation responsive to contact of its cylindrical surface in use by mobile tape winding to said driven cassette hub and guided by said tape guide contact element and which has a diameter sized too large to be accommodated beneath the aforesaid non-extracted leader tape of said cassette, tape cutting means disposed at said splicing station and addressing a cutting location at which tape is disposed on the splicing surface in use and tape splicing means for splicing tape ends together upon said splicing surface.

2. An apparatus as claimed in claim 1 wherein said tape supply station comprises means for mounting a plurality of separate stores of tape.

3. An apparatus as claimed in claim 2 wherein means is provided to mount a pair of separate magnetic tape stores for sequential use and changeover means is provided to introduce to the tape winding path a tape supply from a second magnetic tape store once the tape supply from a first is exhausted or depleted to a predetermined extent.

4. An apparatus as claimed in claim 3 wherein said tape supply station is configured to provide a pair of use tape stores in use and comprising a pair of tape tension control means, one tape tension control means being provided respectively for each tape store of said pair of tape stores and disposed to receive tape therefrom in use of the apparatus and said changeover means is changeover means disposed downstream of said tape tension control means for addressing the output tape of said tape tension control means of said use tape stores successively at a tape pick-up station downstream of said tape tension control means and outside said tape winding path, said changeover means being operable to introduce successively to said tape winding path use tape from each of said use tape stores by disposition thereof upon said splicing surface by a transfer member of said changeover means displaceable between said tape pick-up station and said splicing station, said changeover means being operable so as in use to address at said pick-up station one such use tape store and pick-up use tape therefrom, preparative to introducing said use tape to said winding path, during the time the use tape of the other use tape store issues to the tape winding path to supply the splicing station and the cassette hub.

5. An apparatus as claimed in claim 3 wherein said changeover means comprises a member displaceable by rotation between a tape pick-up location outside the tape winding path and a tape-release position in which said member addresses the tape splicing surface, the member being displaceable perpendicularly with respect to the plane of the aforesaid displacement between a lockable position in which the member can be locked in said tape pick-up position and the aforesaid rotational displacement is prevented and a position in which the member is free to suffer said displacement by rotation to said tape-release position.

6. An apparatus as claimed in claim 1 wherein said extraction means is disposed for rotation displacement whereby the leader tape loop is carried to the splicing surface in said first phase of reciprocation and transferred to said final guide member in said second phase of reciprocation.

7. An apparatus as claimed in claim 6 wherein said leader extraction means comprises an eccentric mounted for said rotational displacement and provided with a tape extraction element forming said leader extraction member and originating therefrom proximate the extremity thereof radially most remote from the axis of rotation of said eccentric and serving as said leader extraction member.

8. An apparatus as claimed in claim 7 wherein the leader extraction means is rotationally displaceable between stops which define the radial positions of the leader extraction member at which first the non-extracted leader tape is almost in contact by its underside with the leader extraction member and at which secondly the extracted leader tape loop carried by said leader extraction member defines a loop plane which is interfacially juxtaposed to the final guide member such that the extrapolated axis of rotation of said final guide member and an imaginary cylinder having the same axis and the diameter of said final guide member intersects with said loop plane.

9. An apparatus as claimed in claim 1 wherein said final guide member is reciprocatively displaceable linearly upon the axis of its rotation.

10. An apparatus as claimed in claim 1 and including a tachometric tape transport speed monitor including a tacho wheel and interfaced for the speed control purposes of the apparatus with said power means, and the plurality of tape guides defining with said splicing station and said tacho wheel said tape winding path from said tape supply station to said cassette hub, said tacho wheel being disposed in the tape winding path downstream of said splicing station.

11. An apparatus as claimed in claim 10 wherein said final guide member forms a tacho wheel of a tachometric tape transport speed monitor interfaced for the speed control purposes of the apparatus with said power means.

12. An apparatus as claimed in claim 1 wherein a leader tape retaining member is disposed for displacement from the locus of the splicing surface to carry a charge of upstream leader tape from said tape path after operation of said tape cutting means to sever the leader tape into separate upstream and downstream leader tape portions and for reciprocal displacement to restore said upstream leader tape portion to said tape path at said splicing surface at termination of use tape winding into said cassette, preparative to splicing of the leading end of said upstream leader tape portion to the use tape trailing end disposed upon said splicing surface after operation of said tape cutting means in relation to use tape stationary on the splicing surface at said winding termination.

13. A method of loading tape into cassettes which method comprises disposing a leading end of use tape emanating from a use tape supply at a use tape supply station of a tape winding apparatus upon a splicing surface of the apparatus, while retaining the use tape on said splicing surface for cutting the tape across its lateral dimension to form separate upstream and downstream portions of use tape, charging a zero cassette to said apparatus subsequent to said cutting or at a previous juncture, extracting a loop of leader tape from said cassette and disposing said leader tape of said loop on the splicing surface, while retaining the leader tape on the splicing surface either cutting the leader tape across its lateral dimension in overlying relationship with the upstream portion of use tape and with the leader tape cut corresponding to the position of the cut end of the upstream portion of use tape whereby separate upstream and downstream portions of said leader tape are formed, or cutting the use tape and overlying leader tape together whereby both are cut into separate upstream and downstream portions, disposing the upstream leader tape portion on a leader tape retainer and removing said upstream leader tape portion from the splicing surface by displacement of said leader tape retainer, splicing the so exposed upstream portion of use tape on the splicing surface to the downstream portion of leader tape on the splicing surface, and winding use tape into the cassette, the downstream portion of said use tape being removed from the splicing surface, and at a post-winding juncture restoring the use tape to the splicing surface, cutting the use tape thereon, the upstream leader tape portion being brought into end-to-end abutment on the splicing surface with the trailing end of the so-cut use tape, splicing together the abutting ends and discharging the loaded cassette preparative to loading a further cassette, characterized in that the loop of leader tape is extracted from the cassette by disposing beneath the non-extracted leader tape loop of said cassette a leader extraction member of leader extraction means forming part of a final guide assembly comprising said leader extraction means and a final guide member of a plurality of tape guide members defining with said splicing surface a tape winding path from said use tape supply to said cassette, removing the leader extraction member from the locus of the cassette by displacement of said leader extraction member in the plane of said loop to carry said loop externally from the cassette to said splicing surface and to the locus of said final guide member, displacing said final guide member laterally relative to the tape through its width from a position outside the plane of said loop to a position in said plane at a final guiding location of the tape winding path at which said final guide is otherwise fixed for rotation immediately upstream of and adjacent to the cassette input mouth and at a post-splicing juncture releasing the tape loop from said leader extraction means to said final guide and from retention on said splicing surface preparative to said winding, and characterized in that at a post-winding juncture the leader extraction member collects the use tape from the final guide and disposes it upon the splicing surface and the final guide displaces reciprocally with respect to its aforesaid displacement.

14. A tape winding apparatus which comprises a use tape supply station configured for the provision of a pair of use tape stores in use and comprising a pair of tape tension control means, one tape tension control means being provided respectively for each tape store of said pair of tape stores and disposed to receive tape therefrom in use of the apparatus, a tape splicing station disposed downstream of the tape supply station and so as in use to receive on a tape splicing surface thereof use tape wound from a tape tension control means and use tape store disposed at said tape supply station, a cassette holding station disposed downstream of said tape splicing station and so as in use to receive on a hub of a cassette disposed at said cassette holding station, tape wound from said tape splicing station in use, tape winding power means for driving said cassette hub to effect tape winding, a plurality of tape guides for defining with said splicing station a tape winding path extending from said use tape supply station to said cassette hub, the apparatus including leader extraction means having an extraction member displaceable between a first position in which in use it is disposed in juxtaposed relation to the non-extracted leader tape loop of the leader tape of a zero cassette charged in use to said cassette holding station and a second position in which it has been removed from the locus of the cassette to carry the leader tape loop externally of the cassette to said splicing surface of said splicing station, changeover means disposed downstream of said tape tension control means for addressing the output tape of said tape tension control means of said use tape stores successively at a tape pick-up station downstream of said tape tension control means and outside said tape winding path, said changeover means being operable to introduce successively to said tape winding path use tape from each of said use tape stores by disposition thereof upon said splicing surface by a transfer member of said changeover means displaceable between said tape pick-up station and said splicing station, said changeover means being operable so as in use to address at said pick-up station one such use tape store and pick-up use tape therefrom, preparative to introducing said use tape to said winding path, during the time the use tape of the other use tape store issues to the tape winding path to supply the splicing station and the cassette hub, tape cutting means disposed at said splicing station and addressing a cutting location at which tape is disposed on the splicing surface in use and tape splicing means for splicing tape ends together upon said splicing surface.

15. An apparatus as claimed in claim 14 and including a tachometric tape transport speed monitor which includes a tacho wheel and is interfaced for the speed control purposes of the apparatus with said power means, said plurality of tape guides defining with said splicing station and said tacho wheel a tape winding path from said tape supply station to said cassette hub and said tacho wheel being disposed in the tape winding path downstream of said splicing station.

16. An apparatus as claimed in claim 14 and comprising a use tape supply station, a tape splicing station disposed so as in use to receive on a tape splicing surface thereof use tape wound from the use tape supply station in use, a cassette holding station disposed so as in use to receive on a hub of a cassette disposed at said cassette holding station, tape wound from said tape splicing station, tape winding power means for driving said cassette hub to effect said winding of said tape, and a plurality of tape guides defining with said splicing station a tape winding path from said use tape supply station to said cassette hub, said plurality of tape guides including a final guide assembly for issuing tape to said cassette hub in winding of use tape from the use tape supply by the apparatus, said final guide assembly comprising leader extraction means comprising a leader extraction member and a final guide member, the leader extraction member having a rest position in which said member is disposed to penetrate beneath the non-extracted leader tape of the leader tape loop of a zero cassette charged to said cassette holding station and being mounted and arranged for two phases of reciprocatory displacement in the plane of said loop so that said leader extraction member can be removed from the locus of said cassette in a first phase of reciprocation to carry the leader tape loop externally from the cassette to said splicing surface of said splicing station and to the locus of said final guide member for release of said extracted tape loop and transfer thereof to said final guide member by said leader extraction member in a second phase of said reciprocatory displacement of said leader extraction member, said final guide member being displaceable laterally relative to the tape reciprocally between a position in and a position outside the plane of said loop at a final tape guiding location of the tape winding path at which said final guide member is otherwise fixed for rotation immediately upstream of and adjacent to the cassette input mouth, and said final guide member comprising a circularly cylindrical tape guide contact element which is mounted for rotation responsive to contact of its cylindrical surface in use by mobile tape winding to said driven cassette hub and guided by said tape guide contact element and which has a diameter sized too large to be accommodated beneath the aforesaid non-extracted leader tape of said cassette.

17. An apparatus as claimed in claim 14 wherein the leader extraction means comprises an eccentric mounted for said rotational displacement and provided with a tape extraction element forming said leader extraction member and originating therefrom proximate the extremity thereof radially most remote from the axis of rotation of said eccentric and serving as said leader extraction member.

18. A method of loading tape into cassettes which method comprises securing a leading end of use tape from a first use tape store to changeover means of a tape winding apparatus, the securing of said tape being effected at a tape pick-up station of the apparatus downstream of said first use tape store, performing tape loading by operating the changeover means to carry the use tape to a splicing surface of the apparatus, while retaining the use tape on said splicing surface optionally cutting the tape across its lateral dimension to form separate upstream and downstream portions of use tape, charging a zero cassette to said apparatus subsequent to said cutting or at a previous juncture, extracting a loop of leader tape from said cassette and disposing said leader tape of said loop on the splicing surface, the changeover means being operated to restore said changeover means to the tape pickup station, while retaining the leader tape on the splicing surface either cutting the leader tape across its lateral dimension in overlying relationship with the upstream portion of use tape and with the leader tape cut corresponding to the position of the cut end of the upstream portion of use tape whereby separate upstream and downstream portions of said leader tape are formed, or cutting the use tape and overlying leader tape together whereby both are cut into separate upstream and downstream portions, disposing the upstream leader tape portion on a leader tape retainer and removing said upstream leader tape portion from the splicing surface by displacement of said leader tape retainer, splicing the so exposed upstream portion of use tape on the splicing surface to the downstream portion of leader tape on the splicing surface, and winding use tape into the cassette, the downstream portion of said use tape being removed from the splicing surface, and at a post-winding juncture restoring the use tape to the splicing surface, cutting the use tape thereon, the upstream leader tape portion being brought into end-to-end abutment on the splicing surface with the trailing end of the so-cut use tape, splicing together the abutting ends and discharging the loaded cassette preparative to loading a further cassette, while winding of said cassette or a further cassette takes place a leading end of use tape from a second use tape store being secured to said changeover means at said tape pick-up station preparative to repeating the aforesaid tape loading using the second use tape store once the first use tape store is exhausted or has reached a predetermined reduction.

19. A tape winding apparatus comprising a use tape supply station, a tape splicing station disposed so as in use to receive on a tape splicing surface thereof use tape wound from the use tape supply station in use, a cassette holding station disposed so as in use to receive on a hub of a cassette disposed at said cassette holding station tape wound from said tape splicing station, tape winding power means for driving said cassette hub to effect said winding of said tape, a tachometric tape transport speed monitor including a tacho wheel and interfaced for the speed control purposes of the apparatus with said power means, a plurality of tape guides defining with said splicing station and said tacho wheel a tape winding path from said tape supply station to said cassette hub, the apparatus including leader extraction means having a leader extraction member displaceable between a first position in which it is disposed beneath the non-extracted leader tape of the leader tape loop of a zero cassette charged to said cassette holding station and a second position in which it has been removed from the locus of the cassette to carry a leader tape loop externally of the cassette to said splicing surface of said splicing station, said tacho wheel being disposed in the tape winding path downstream of said splicing station, tape cutting means disposed at said splicing station and addressing a cutting location at which tape is disposed on the splicing surface in use and tape splicing means for splicing tape ends together upon said splicing surface.

20. An apparatus as claimed in claim 19 wherein said tape supply station is configured to provide a pair of use tape stores in use and comprising a pair of tape tension control means, one tape tension control means being provided respectively for each tape store of said pair of tape stores and disposed to receive tape therefrom in use of the apparatus and said changeover means is changeover means disposed downstream of said tape tension control means for addressing the output tape of said tape tension control means of said use tape stores successively at a tape pick-up station downstream of said tape tension control means and outside said tape winding path, said changeover means being operable to introduce successively to said tape winding path use tape from each of said use tape stores by disposition thereof upon said splicing surface by a transfer member of said changeover means displaceable between said tape pick-up station and said splicing station, said changeover means being operable so as in use to address at said pick-up station one such use tape store and pick-up use tape therefrom, preparative to introducing said use tape to said winding path, during the time the use tape of the other use tape store issues to the tape winding path to supply the splicing station and the cassette hub.

21. An apparatus as claimed in claim 19 and comprising a use tape supply station, a tape splicing station disposed so as in use to receive on a tape splicing surface thereof use tape wound from the use tape supply station in use, a cassette holding station disposed so as in use to receive on a hub of a cassette disposed at said cassette holding station, tape wound from said tape splicing station, tape winding power means for driving said cassette hub to effect said winding of said tape, and a plurality of tape guides defining with said splicing station a tape winding path from said use tape supply station to said cassette hub, said plurality of tape guides including a final guide assembly for issuing tape to said cassette hub in winding of use tape from the use tape supply by the apparatus, said final guide assembly comprising leader extraction means comprising a leader extraction member and a final guide member, the leader extraction member having a rest position in which said member is disposed to penetrate beneath the non-extracted leader tape of the leader tape loop of a zero cassette charged to said cassette holding station and being mounted and arranged for two phases of reciprocatory displacement in the plane of said loop so that said leader extraction member can be removed from the locus of said cassette in a first phase of reciprocation to carry the leader tape loop externally from the cassette to said splicing surface of said splicing station and to the locus of said final guide member for release of said extracted tape loop and transfer thereof to said final guide member by said leader extraction member in a second phase of said reciprocatory displacement of said leader extraction member, said final guide member being displaceable laterally relative to the tape reciprocally between a position in and a position outside the plane of said loop at a final tape guiding location of the tape winding path at which said final guide member is otherwise fixed for rotation immediately upstream of and adjacent to the cassette input mouth, and said final guide member comprising a circularly cylindrical tape guide contact element which is mounted for rotation responsive to contact of its cylindrical surface in use by mobile tape winding to said driven cassette hub and guided by said tape guide contact element and which has a diameter sized too large to be accommodated beneath the aforesaid non-extracted leader tape of said cassette.

22. A method of winding use tape into cassettes which method comprises winding use tape from a supply to a splicing station, cutting the tape on a splicing surface at said splicing station, splicing the cut upstream use tape leading end to the trailing end of a cut+downstream portion of leader tape emanating from the wind-in mouth of a cassette downstream of said splicing station, winding the leader tape and spliced use tape into the cassette, and post-winding cutting the use tape on said splicing surface and splicing the resulting trailing end to the leading end of an upstream portion of leader tape emanating from the other cassette mouth and previously forming an unbroken loop of leader tape between the cassette hubs with said leader tape downstream portion, characterized in that winding is effected by means of electrical motive power means controlled by speed control means interfaced with a tachometric tape speed monitoring device having a tacho wheel in the tape winding path addressing the motion of tape downstream of the splicing station and upstream of the cassette wind-in mouth.

* * * * *